US011482086B2

(12) United States Patent
Takeda et al.

(10) Patent No.: US 11,482,086 B2
(45) Date of Patent: Oct. 25, 2022

(54) DRIVE CONTROL DEVICE, DRIVE CONTROL METHOD, AND PROGRAM

(71) Applicant: Sony Corporation, Tokyo (JP)

(72) Inventors: Hirofumi Takeda, Kanagawa (JP); Shiro Suzuki, Kanagawa (JP); Shuichiro Nishigori, Tokyo (JP); Jun Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/265,795

(22) PCT Filed: Jun. 12, 2019

(86) PCT No.: PCT/JP2019/023277
§ 371 (c)(1),
(2) Date: Feb. 3, 2021

(87) PCT Pub. No.: WO2020/031497
PCT Pub. Date: Feb. 13, 2020

(65) Prior Publication Data
US 2021/0166532 A1 Jun. 3, 2021

(30) Foreign Application Priority Data
Aug. 10, 2018 (JP) .............................. JP2018-151657

(51) Int. Cl.
*H04B 3/36* (2006.01)
*G08B 6/00* (2006.01)
(52) U.S. Cl.
CPC ...................................... *G08B 6/00* (2013.01)

(58) Field of Classification Search
CPC ..................................... G06F 6/00; G06F 3/01
See application file for complete search history.

(56) References Cited

U.S. PATENT DOCUMENTS

| 2009/0106655 A1 | 4/2009 | Grant et al. |
| 2012/0056825 A1 | 3/2012 | Ramsay et al. |
| 2021/0173488 A1* | 6/2021 | Wakuda .................... B06B 1/06 |

FOREIGN PATENT DOCUMENTS

| EP | 2209060 A2 | 7/2010 |
| JP | 2008-123431 A | 5/2008 |

(Continued)

OTHER PUBLICATIONS

International Written Opinion dated Aug. 20, 2019 in connection with International Application No. PCT/JP2019/023277, and English translation thereof.

(Continued)

*Primary Examiner* — Toan N Pham
(74) *Attorney, Agent, or Firm* — Wolf, Greenfield & Sacks, P.C.

(57) ABSTRACT

To prevent delay in tactile presentation timing due to the responsiveness of the tactile presentation device, and to improve the reproducibility of the tactile sense.
A drive control device according to the present technology includes a drive control unit that causes a drive unit that drives a tactile presentation device by a drive signal based on a tactile signal to execute a pre-drive, which is to drive the tactile presentation device in advance with respect to a rise timing of the tactile signal. By the pre-drive described above, a timing at which a tactile presentation is actually started can be brought close to a rise timing of a tactile signal.

17 Claims, 16 Drawing Sheets

(56) References Cited

FOREIGN PATENT DOCUMENTS

| | | | |
|---|---|---|---|
| JP | 2010-506302 A | 2/2010 | |
| JP | 2011-192277 A | 9/2011 | |
| JP | 2015-053038 A | 3/2015 | |
| JP | 2016-202486 A | 12/2016 | |
| JP | 2017-220026 A | 12/2017 | |
| JP | 2018-060313 A | 4/2018 | |
| WO | WO 2008/042745 A2 | 4/2008 | |
| WO | WO-2014034550 A1 * | 3/2014 | ........... G06F 1/1626 |

OTHER PUBLICATIONS

International Preliminary Report on Patentability dated Feb. 25, 2021 in connection with International Application No. PCT/JP2019/023277, and English translation thereof.

International Search Report and English translation thereof dated Aug. 20, 2019 in connection with International Application No. PCT/JP2019/023277.

* cited by examiner

DRIVE CONTROL DEVICE, DRIVE CONTROL METHOD, AND PROGRAM

CROSS-REFERENCE TO RELATED APPLICATIONS

This application claims the benefit under 35 U.S.C. § 371 as a U.S. National Stage Entry of International Application No. PCT/JP2019/023277, filed in the Japanese Patent Office as a Receiving Office on Jun. 12, 2019, which claims priority to Japanese Patent Application Number JP2018-151657, filed in the Japanese Patent Office on Aug. 10, 2018, each of which is hereby incorporated by reference in its entirety.

TECHNICAL FIELD

The present technology relates to a drive control device that performs drive control for a tactile presentation device that presents tactile information to a toucher on the basis of a tactile signal such as a vibration signal, a method thereof, and a program.

BACKGROUND ART

In recent years, applications that give tactile stimulation by a tactile presentation device brought into contact with human skin have been used in various situations. Here, the term "tactile presentation" means to generate tactile stimulation.

For example, in a mobile terminal equipped with a touch screen such as a smartphone, a touch feeling of a button is simulated by vibrating a screen (or housing) to apply tactile stimulation to a finger at the time of touch operation of the screen.

In music listening, a tactile presentation device is built into the headphone housing, and tactile stimulation is given in parallel with music reproduction to emphasize deep bass.

In the field of computer games and virtual reality (VR), there is a case in which a tactile presentation device installed in a controller enhances the user's immersive feeling by giving tactile stimulation interactively in accordance with a scene in response to the user operation.

In some amusement facilities, the realistic feeling of visitors is improved by giving tactile stimulation in accordance with the scenes by tactile presentation devices installed in the seats of movie theaters and theme parks.

Furthermore, those in a stage of research and development include hazard prediction that causes the operator to intuitively sense the situation around a remotely operated robot or an object by feeding back, to the controller at hand of the operator, vibrations received by the robot or the object to be operated (Example: Disaster Response Robot <http://www.rm.is.tohoku.ac.jp/quince_mech/#_8>).

Moreover, in the medical field, research has been conducted to improve the surgery accuracy by feeding back to the operator the feeling (hardness) of the endoscope forceps touching an organ when operating a surgical robot (Example: da Vinci, Surgical Assist Robot <http://techon.nikkeibp.co.jp/article/FEATURE/20150217/4044 60/?P=2>).

Here, as for the tactile reproduction device, a device having a resonance frequency at a frequency (about 100 Hz) with good sensitivity in the tactile sense of a human being such as an eccentric motor (ERM) or a linear actuator (LRA) is widely used (see Patent Document 1, for example).

Furthermore, for the tactile signals, signals generated on the basis of the audio signal are sometimes used instead of signals sensed by the tactile sensor (see Patent Document 2, for example).

CITATION LIST

Patent Document

Patent Document 1: Japanese Patent Application Laid-Open No. 2016-202486
Patent Document 2: Japanese Patent Application Laid-Open No. 2015-53038

SUMMARY OF THE INVENTION

Problems to be Solved by the Invention

Here, the mainstream of the current tactile presentation device is a so-called vibration device in which the device itself physically vibrates to vibrate the human body and thus generates tactile stimulation. Vibration devices often have a large mass because they need to vibrate and sufficiently stimulate the relatively insensitive skin, and therefore they tend to be less time responsive. That is, it is known that even if a certain amplitude value is given as the drive voltage, it takes long time to reach the desired amplitude from the state of 0 amplitude, and that, for example, an eccentric motor requires about 100 ms, and a linear actuator requires about 10 ms even if the drive voltage is temporarily overshot by using a booster circuit in combination.

Therefore, the vibration generated by these vibration devices is delayed with respect to a drive voltage having a large amplitude change, and therefore it is difficult to present tactile stimulation at a desired timing, and it is difficult to express a steep rise such as vibration of a collision.

The present technology has been made in view of the above circumstances, and it is an object of the present technology to prevent delay in tactile presentation timing due to the responsiveness of the tactile presentation device and to improve the reproducibility of the tactile sense.

Solutions to Problems

A drive control device according to the present technology includes a drive control unit that causes a drive unit that drives a tactile presentation device by a drive signal based on a tactile signal to execute a pre-drive, which is to drive the tactile presentation device in advance with respect to a rise timing of the tactile signal.

By the pre-drive described above, a timing at which a tactile presentation is actually started can be brought close to a rise timing of a tactile signal.

In the drive control device according to the present technology described above, it is desirable that the drive control unit start the pre-drive at a timing corresponding to a responsiveness of the tactile presentation device.

This makes it possible to set a timing at which a tactile presentation is actually started to a timing corresponding to a responsiveness of a tactile presentation device.

In the drive control device according to the present technology described above, it is desirable that the drive control unit start the pre-drive at a timing corresponding to a rise height of the tactile signal.

This makes it possible to set a timing at which a tactile presentation is actually started to a timing corresponding to a rise height of a tactile signal.

In the drive control device according to the present technology described above, the tactile signal is accompanied by timing-related information, which is information regarding a timing of the pre-drive, by encoding, and it is desirable that the drive control unit cause the drive unit to execute the pre-drive on the basis of the timing-related information.

This eliminates the need for analysis of a tactile signal on the decoding side when executing a pre-drive at an appropriate timing.

In the drive control device according to the present technology described above, it is desirable that the timing-related information include information indicating a rise timing of the tactile signal.

This eliminates the need for signal analysis for detecting a rise timing of the tactile signal on the decoding side when executing a pre-drive at an appropriate timing.

In the drive control device according to the present technology described above, it is desirable that the timing-related information include information indicating a rise height of the tactile signal.

This eliminates the need for signal analysis for detecting a rise height of a tactile signal on the decoding side when executing a pre-drive at an appropriate timing.

In the drive control device according to the present technology described above, it is desirable that the drive control unit execute the pre-drive with a drive signal strength corresponding to a rise height of the tactile signal.

This makes it possible to prevent a delay of a presentation timing to the toucher at the moment of the maximum amplitude at a rise portion of a tactile signal.

In the drive control device according to the present technology described above, it is desirable that the drive control unit execute the pre-drive with a drive signal strength corresponding to a perception threshold value related to a human tactile sense.

This makes it possible to match the timing at which a toucher starts to perceive tactile stimulation corresponding to a rise portion of a tactile signal with an original timing.

In the drive control device according to the present technology described above, it is desirable that the drive control unit execute the pre-drive with a drive signal strength corresponding to the lowest value of the perception threshold value.

This prevents tactile stimulation from being perceived regardless of a frequency component of a rise portion of a tactile signal.

In the drive control device according to the present technology described above, it is desirable that the drive control unit determine a start timing of the pre-drive in units of frames of the tactile signal.

This eliminates the need for timer management in units of samples of a tactile signal when determining a start timing of a pre-drive.

In the drive control device according to the present technology described above, it is desirable that the drive control unit determine a start timing of the pre-drive in units of samples of the tactile signal.

This makes it possible to improve an accuracy of a start timing of a pre-drive.

In the drive control device according to the present technology described above, it is desirable that the drive control unit set a start timing of the pre-drive or a drive signal strength on the basis of an operation.

This makes it possible for a system user such as a toucher to adjust a start timing of a pre-drive and a drive signal strength.

In the drive control device according to the present technology described above, it is desirable that the drive unit drive the tactile presentation device by the drive signal amplified by an amplifier, and the drive control unit perform control of bringing the amplifier into a power saving state on the basis of an amplitude value of the tactile signal, and perform control of bringing the amplifier into a start-up state on the basis of a start timing of the pre-drive.

This makes it possible to reduce power consumption caused by bringing an amplifier into a power saving state in a period other than a rise portion of a tactile signal in response to a case where a rise portion of a tactile signal exists discretely in a time direction, and to bring an amplifier into a start-up state before a start timing of a pre-drive.

In the drive control device according to the present technology described above, it is desirable that the drive unit drive a plurality of the tactile presentation devices, and the drive control unit perform the pre-drive so that a tactile presentation timing is synchronized among the plurality of tactile presentation devices.

This makes it possible to prevent variation in tactile presentation timing for each tactile presentation device in a case where a plurality of tactile presentation devices having different responsiveness is used.

In the drive control device according to the present technology described above, it is desirable that the drive unit drive the plurality of tactile presentation devices, each of which performing tactile presentation to a different receptor of a human body, and the drive control unit execute the pre-drive for each tactile presentation device at a drive signal strength or start timing corresponding to characteristics of the receptor.

This makes it possible to perform the pre-drive for each tactile presentation device in an appropriate mode corresponding to characteristics of a target receptor in a case where a plurality of tactile presentation devices performs tactile presentation targeting different receptors of a human body.

In the drive control device according to the present technology described above, it is desirable that the drive unit drive the plurality of tactile presentation devices, and the drive control unit execute the pre-drive for each tactile presentation device with a drive signal strength corresponding to a tactile presentation site of the tactile presentation device in a human body.

This makes it possible to perform the pre-drive for each tactile presentation device in an appropriate mode corresponding to tactile characteristics of a site of a human body in a case where a plurality of tactile presentation devices performs tactile presentation targeting different sites of a human body.

Furthermore, a drive control method according to the present technology is a drive control method including causing a drive unit that drives a tactile presentation device by a drive signal based on a tactile signal to execute the pre-drive, which is to drive the tactile presentation device in advance with respect to a rise timing of the tactile signal.

Such drive control method also achieves similar operations to those of the drive control device according to the present technology.

Furthermore, a program according to the present technology is a program that causes an information processing device to implement a function of causing a drive unit that drives a tactile presentation device by a drive signal based on a tactile signal to execute the pre-drive, which is to drive the tactile presentation device in advance with respect to a rise timing of the tactile signal.

Such program according to the present technology implements the drive control device according to the present technology.

Effects of the Invention

According to the present technology, it is possible to prevent delay in tactile presentation timing due to the responsiveness of the tactile presentation device, and it is possible to improve the reproducibility of the tactile sense.

Note that the effects described here are not necessarily limited, and may be any of the effects described in the present disclosure.

MODE FOR CARRYING OUT THE INVENTION

Embodiments according to the present technology will be described below in the following order with reference to the accompanying drawings.

<1. First embodiment>
[1-1. Outline of tactile reproduction system]
[1-2. Configuration of encoding device]
[1-3. Configuration of reproduction device]
[1-4. Drive method as embodiment]
(Outline of drive method)
(Application example)
(Configuration on encoding side)
(Function configuration on decoding side)
(Processing procedure on decoding side)
[1-5. First variation]
[1-6. Second variation]
[1-7. Third variation]
[1-8. Fourth variation]
<2. Second embodiment>
[2-1. Configuration of tactile reproduction system]
[2-2. First application example]
[2-3. Second application example]
[2-4. Third application example]
<3. Variations>
<4. Summary of embodiments>
<5. Present technology>

Here, in the present description, each term is defined as follows.

Tactile stimulation: Physical phenomenon that causes a human to perceive tactile sense, such as a vibration phenomenon.

Tactile presentation: To generate tactile stimulation.

Tactile information: Information perceived by the tactile sense, such as vibration information.

Tactile signal: A signal representing a pattern of tactile stimulation, such as a signal representing a vibration waveform.

Toucher: A human who receives tactile presentation.

Tactile characteristics: Characteristics related to human tactile sense.

1. FIRST EMBODIMENT

[1-1. Outline of Tactile Reproduction System]

Figure 1:
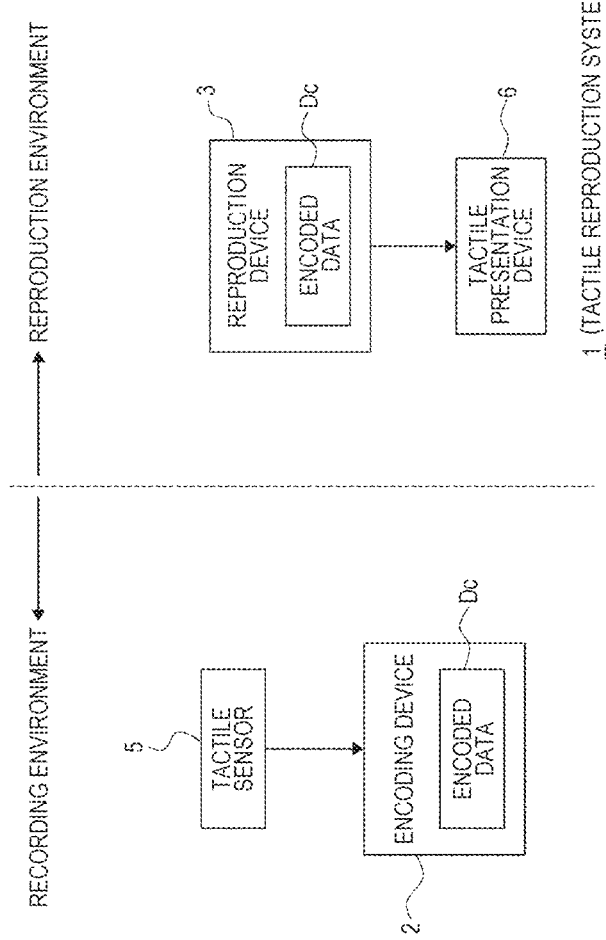
FIG. 1 is a diagram showing a configuration example of a tactile reproduction system that includes a drive control device as an embodiment according to the present technology.

FIG. 1 is a diagram showing a configuration example of a tactile reproduction system 1 that includes a drive control device (reproduction device 3) as an embodiment according to the present technology.

First, in the present embodiment, the environment for realizing tactile reproduction is divided into a recording environment in which a tactile signal obtained by sensing target tactile information (tactile stimulation) is encoded and encoded data Dc obtained by the encoding is recorded, and a reproduction environment in which tactile information is reproduced on the basis of a tactile signal obtained by decoding the encoded data Dc.

As illustrated, the tactile reproduction system 1 includes, in the recording environment, a tactile sensor 5 and an encoding device 2 to which the tactile sensor 5 is connected, and includes, in the reproduction environment, a reproduction device 3 configured to be acquirable of the encoded data Dc and a tactile presentation device 6 connected to the reproduction device 3.

The tactile sensor 5 is a sensor that senses tactile stimulation, and in this example, a vibration sensor such as a piezo pickup or an acceleration sensor is used. The tactile sensor 5 is brought into contact with an object to be sensed, i.e., a human body in this example, to output vibration and motion as a voltage change.

The encoding device 2 includes a computer device such as a central processing unit (CPU) and a digital signal processor (DSP), performs encoding in accordance with a predetermined data format regarding a detection signal (tactile signal) by the tactile sensor 5, and records the encoded data Dc obtained by the encoding into a storage device provided inside, for example.

The reproduction device 3 includes a computer device such as a CPU and a DSP, decodes the encoded data Dc having been acquired, and drives the tactile presentation device 6 on the basis of the tactile signal obtained by the decoding. For example, the encoded data Dc recorded in the recording environment is acquired by the reproduction device 3 via a required network such as the Internet. Alternatively, the encoded data Dc can be recorded on a portable recording medium, and the reproduction device 3 can acquire the encoded data Dc via the recording medium.

The tactile presentation device 6 is a device that generates tactile stimulation, and in this example, a vibration device such as a vibrator or an actuator is used.

The tactile presentation device 6 is attached to a predetermined site of the human body of the toucher so as to reproduce the tactile stimulation sensed by the tactile sensor 5.

The tactile reproduction system 1 shown in FIG. 1 is configured as a system in which the tactile information perceived by a person wearing the tactile sensor 5 is reproduced at the toucher, and as a system capable of coping with a case in which both persons are at remote places from each other.

Note that FIG. 1 shows an example in which the tactile presentation device 6 is provided separately from the reproduction device 3, but the tactile presentation device 6 can be configured integrally with the reproduction device 3. Specifically, for example, a vibration device can be configured to be incorporated in a portable terminal such as a smartphone.

[1-2. Configuration of Encoding Device]

Figure 2:
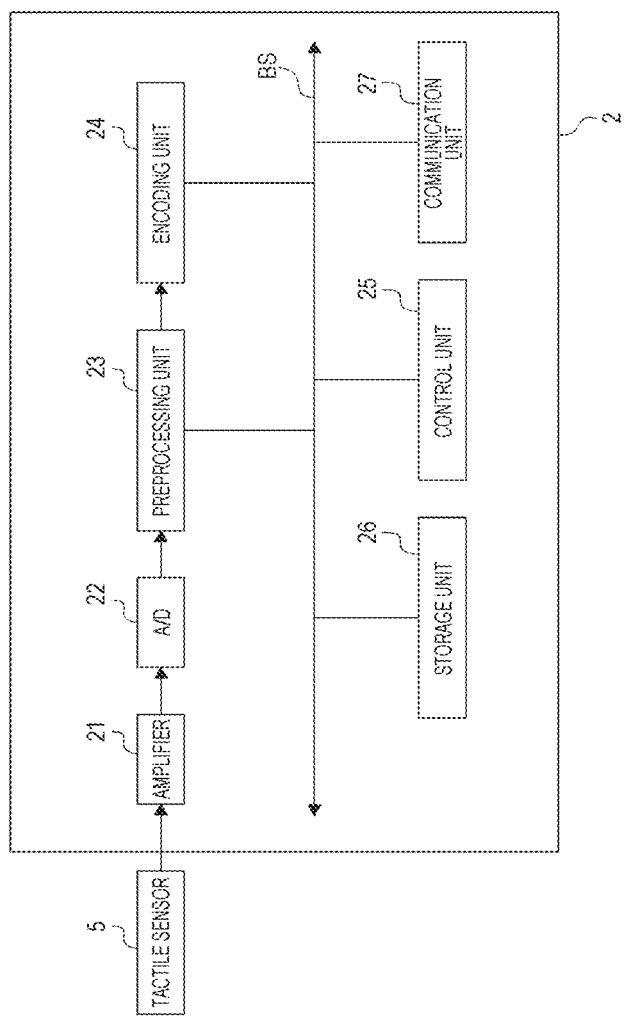
FIG. 2 is a diagram for explaining an internal configuration example of an encoding device as a first embodiment.

FIG. 2 is a diagram for explaining an internal configuration example of the encoding device 2. Note that FIG. 2 also shows the tactile sensor 5 shown in FIG. 1 together with an internal configuration example of the encoding device 2.

As illustrated, the encoding device 2 includes an amplifier 21, an A/D converter 22, a preprocessing unit 23, an encoding unit 24, a control unit 25, a storage unit 26, a communication unit 27, and a bus BS. The preprocessing unit 23, the encoding unit 24, the control unit 25, the storage unit 26, and the communication unit 27 are connected with one another via the bus BS so that they can communicate with one another.

The detection signal of the tactile sensor 5 is input to the amplifier 21, adjusted to have an appropriate dynamic range, and then input to the A/D converter 22 for A/D conversion.

The A/D-converted detection signal (i.e., a tactile signal that represents a pattern of tactile stimulation) is input to the preprocessing unit 23. The preprocessing unit 23 performs various kinds of digital signal processing such as noise removal and calibration of the sensor characteristics of the tactile sensor 5.

The tactile signal subjected to the signal processing by the preprocessing unit 23 is input to the encoding unit 24.

The encoding unit 24 includes, for example, a DSP, and encodes the input tactile signal in accordance with a predetermined data format.

Note that the coding of the tactile signal as the present embodiment will be described later again.

The control unit 25 includes, for example, a microcomputer having a CPU, a read only memory (ROM), and a random access memory (RAM), and performs overall control of the encoding device 2 by executing processing in accordance with a program stored in the ROM.

For example, the control unit 25 performs data communication with an external device via the communication unit 27.

The communication unit 27 is configured to be capable of performing data communication with an external device via a network such as the Internet, and the control unit 25 is configured to be capable of performing data communication with an external device connected to the network via the communication unit 27. In particular, the tactile signal (the encoded data Dc described above) encoded by the encoding unit 24 can be transmitted to an external device via the communication unit 27.

The storage unit 26 comprehensively represents a storage device such as a hard disk drive (HDD) or a solid state drive (SSD), and is used for various data storage in the encoding device 2. For example, the storage unit 26 stores data necessary for control by the control unit 25. Furthermore, on the basis of the control of the control unit 25, the tactile signal (the encoded data Dc) encoded by the encoding unit 24 can be stored in the storage unit 26.

[1-3. Configuration of Reproduction Device]

Figure 3:
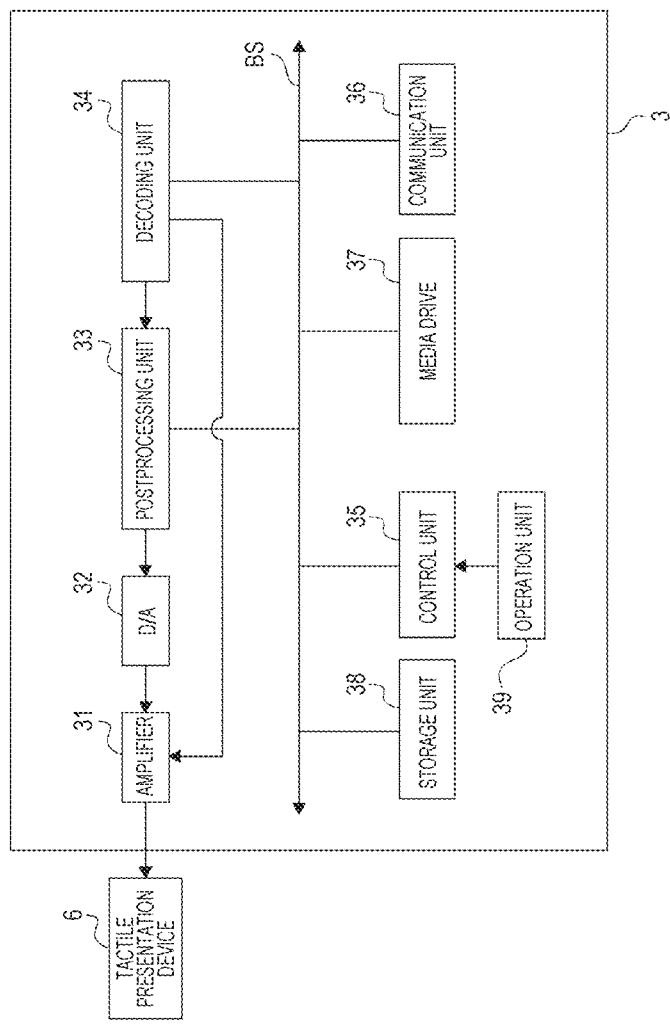
FIG. 3 is a diagram for explaining an internal configuration example of a drive control device as the first embodiment.

FIG. 3 is a diagram for explaining an internal configuration example of the reproduction device 3, and also shows the tactile presentation device 6 shown in FIG. 1 together with an internal configuration example of the reproduction device 3. The reproduction device 3 is an embodiment of a drive control device according to the present technology.

As illustrated, the reproduction device 3 includes an amplifier 31, a D/A converter 32, a postprocessing unit 33, and a decoding unit 34, and also includes a control unit 35, a communication unit 36, a media drive 37, a storage unit 38, and an operation unit 39. The postprocessing unit 33, the decoding unit 34, the control unit 35, the communication unit 36, the media drive 37, and the storage unit 38 are connected with one another via the bus BS so that they can communicate with one another.

The control unit 35 includes, for example, a microcomputer having a CPU, a ROM, and a RAM, and performs overall control of the reproduction device 3 by executing processing in accordance with a program stored in the ROM.

The communication unit 36 is configured to be capable of performing data communication with an external device via a network such as the Internet. The control unit 35 is configured to be capable of performing data communication with an external device connected to the network via the communication unit 36. In particular, the control unit 35 can cause the communication unit 36 to receive the encoded data Dc from an external device such as a server device on the network.

The media drive 37 is configured so that a portable recording medium is detachable, and is configured as a reader/writer unit capable of writing and reading data into and from the mounted recording medium. The recording media supported by the media drive 37 include a memory card (e.g., portable flash memory) and an optical disk recording medium.

The media drive 37 enables reading of the encoded data Dc recorded on a portable recording medium.

The storage unit 38 comprehensively represents a storage device such as an HDD or an SSD, and is used for various data storage in the reproduction device 3. For example, the storage unit 38 stores data necessary for control by the control unit 35. Furthermore, on the basis of the control of the control unit 35, the encoded data Dc read by the media drive 37 and the encoded data Dc received from an external device by the communication unit 36 can also be stored in the storage unit 38.

The operation unit 39 comprehensively represents various operators provided in the reproduction device 3, and outputs operation input information corresponding to the operation input to the control unit 35.

The control unit 35 executes processing corresponding to the operation input information. Therefore, the reproduction device 3 realizes an operation corresponding to the operation input.

The encoded data Dc is input to the decoding unit 34 on the basis of the control of the control unit 35.

The decoding unit 34 obtains a tactile signal by decoding the input encoded data Dc by a method described later. The tactile signal obtained by the decoding unit 34 is input to the postprocessing unit 33.

The postprocessing unit 33 performs signal processing such as calibration of the tactile presentation device 6 and predetermined filter processing as necessary on the tactile signal having been input.

The tactile signal having passed through the postprocessing unit 33 is input to the D/A converter 32, subjected to D/A conversion, adjusted to have an appropriate dynamic range by the amplifier 31, and then output to the tactile presentation device 6.

Therefore, the tactile presentation device 6 is driven on the basis of the tactile signal, and can give the toucher the tactile stimulation that is the target of sensing in the recording environment (i.e., tactile information can be reproduced).

Note that only the tactile signal is mentioned above, but it is also possible to adopt a configuration in which an audio signal and a video signal are recorded together with a tactile signal and sound and video are provided to the toucher together with tactile information.

[1-4. Drive Method as Embodiment]
(Outline of Drive Method)

Here, in reproducing tactile information, it should be considered that a considerable response delay to the drive signal occurs in the tactile presentation device 6. In particular, in a case where a vibration device is used as the tactile presentation device 6 as in the present example, there is a possibility that a relatively large response delay occurs, thereby causing a reproducibility deterioration of the tactile sense.

Therefore, in the present embodiment, it is an object to prevent delay of the tactile presentation timing due to the responsiveness (time responsiveness) of the tactile presentation device 6, and to improve the reproducibility of the tactile sense.

Hereinafter, a drive method as an embodiment for preventing delay of such tactile presentation timing will be described.

First of all, the majority of phenomena related to tactile sense are phenomena in which temporally sparse stimulation, such as contact or collision with a certain object, rather than phenomena in which certain stimulation is constantly continued. Therefore, as illustrated in FIG. 4 for example, majority of tactile signals are those having a value that is 0 in many sections and that rises sharply.

Figure 4:
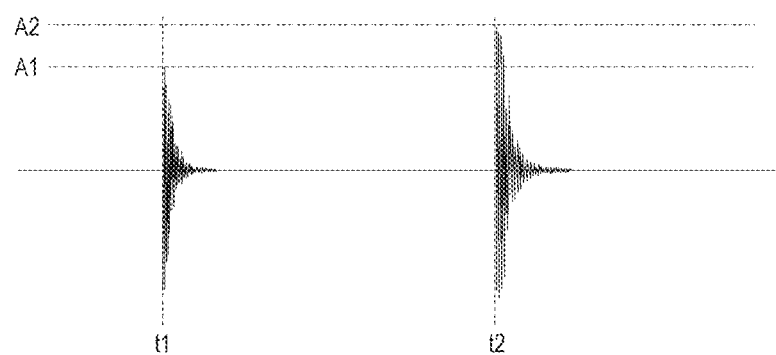
FIG. 4 is a view showing an example of a waveform of a tactile signal.

In consideration of this point, a description will be given below on an assumption of a tactile signal as illustrated in FIG. 4.

In this example, the encoding device 2 analyzes the tactile signal, and obtains the time of the sharp rise of the signal and the rise height. Specifically, in the waveform shown in FIG. 4, the tactile signal rises sharply at times t1 and t2, respectively. These rises are each detected by signal analysis, and rise times t1 and t2 and rise heights A1 and A2 are obtained.

Here, the signal analysis for rise detection may be performed by comparing the set threshold value with the signal strength, or may be performed by a signal processing method such as observing the change rate of the signal strength.

As the encoding of a tactile signal, the encoding device 2 performs encoding of causing information indicating rise timing such as the times t1 and t2 and information indicating the amplitude height of each rise such as rise heights A1 and A2 to accompany the tactile signal.

Specifically, in this example, on an assumption that the tactile signal is handled in units of frames, information indicating the rise timing and information indicating the amplitude height of the rise are caused to accompany every frame.

Figure 5:
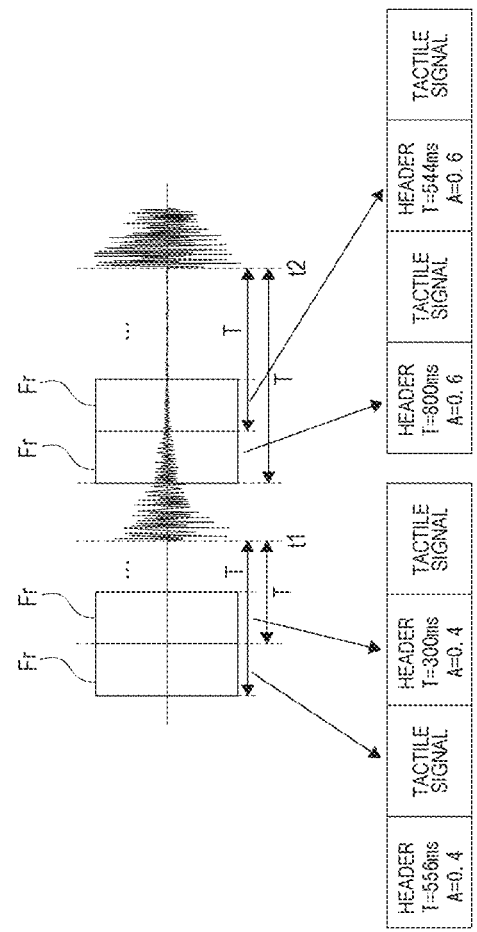
FIG. 5 is an explanatory view showing an encoding method as an embodiment.

FIG. 5 is an explanatory view showing the encoding method as an embodiment.

As illustrated, for every frame Fr of the tactile signal, information ("T" in the figure) indicating the remaining time to the rise time closest to the frame Fr, and information ("A" in the figure) indicating the amplitude height of the rise are stored for each header section.

Hereinafter, the "remaining time to the rise time closest to the frame Fr" described above is expressed as "time T until rise" and the "amplitude height of the rise" described above is expressed as "rise height A".

The time T until rise records, for example, the remaining time from the head time of the frame Fr to the most recent rise time.

Note that in a case where the sampling frequency of the tactile signal is 2 kHz, one sample of the tactile signal is 0.5 ms. In this case, if one frame Fr has 512 samples, 1 frame=256 ms.

Figure 6:
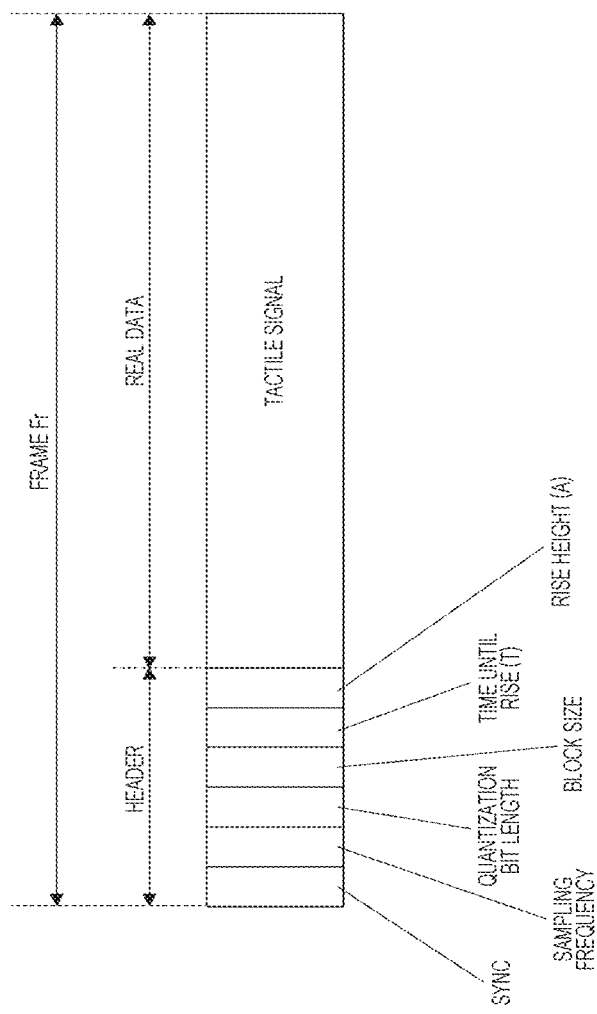
FIG. 6 is a view showing a specific example of an encoding format as an embodiment.

FIG. 6 shows a specific example of an encoding format.

As illustrated, the frame Fr is provided with a header region, which is a region for storing header information, followed by a real data region for storing real data of the tactile signal. The header region is provided with regions for storing information regarding the sync, the sampling frequency, the quantization bit length, the block size, the time T until rise, and the rise height A, in order from the head side.

The sync is an identifier indicating a delimiter of the frame Fr, and stores data according to a predetermined pattern. The sampling frequency and the quantization bit length represent the sampling frequency and the quantization bit length, respectively, of the tactile signal. The block size represents the size in the time direction of the tactile signal stored in the real data region, and stores information in units of the number of samples, for example.

The encoding device 2 (encoding unit 24) encodes the tactile signal in accordance with the format shown in FIG. 6 to generate the encoded data Dc.

The reproduction device 3 drives the tactile presentation device 6 in advance with respect to the rise timing of the tactile signal on the basis of the information regarding the time T until rise and the rise height A stored in the header of the frame Fr in the encoded data Dc. Hereinafter, to drive the tactile presentation device 6 in advance with respect to the rise timing of the tactile signal will be referred to as a "pre-drive".

In the reproduction device 3, the decoding unit 34 first calculates a time length required for the tactile presentation device 6 to generate vibration corresponding to the rise height A on the basis of the information of the rise height A. This time length can be expressed in other words as a time length of the pre-drive necessary for the tactile presentation device 6 to generate vibration with a desired amplitude, and is hereinafter referred to as a "time length Δt".

The time length Δt is obtained as a value based on the responsiveness of the tactile presentation device 6 by performing a calculation using a coefficient representing the responsiveness of the tactile presentation device 6 and the rise height A, for example.

Note that the coefficient representing the responsiveness of the tactile presentation device 6 may be a predetermined value or may be acquired by calibration.

Here, in the reproduction device 3 of this example, power saving control of the amplifier 31 is performed on the assumption that the tactile signal is a signal representing a generation of a temporally sparse tactile stimulation as illustrated in FIG. 4. Specifically, the amplifier 31 is controlled to a power saving state in a period of sufficiently small amplitude existing between the rises of the tactile signal.

It takes a certain amount of time for the amplifier 31 to start up from the power saving state. Therefore, in this example, when the pre-drive described above is performed, the start-up control of the amplifier 31 is performed before the start timing of the pre-drive. That is, where the time required for starting up the amplifier 31 from the power saving state is a start-up time Δta, a control of starting up the amplifier 31 in the power saving state by the start-up time Δta before the start timing of the pre-drive is performed.

Note that the start-up time Δta may be a value obtained as a constant from the characteristics of the amplifier 31 itself. Alternatively, the start-up time Δta can also be dynamically obtained with respect to the rise height A.

The decoding unit 34 performs the following processing for every frame Fr with respect to the encoded data Dc to be input.

That is, the sum "Δt+Δta" of a time length Δt of the pre-drive and the start-up time Δta of the amplifier 31 is obtained. Then, it is determined whether or not the time T until rise is less than the sum Δt+Δta (T<Δt+Δta). Then, if T<Δt+Δta, the amplifier 31 is started up from the power saving state.

After the amplifier 31 is started up in this manner, it is determined whether or not the time T until rise has become less than the length Δt of the pre-drive time (T<Δt). Then, if T<Δt, the pre-drive is started. In this example, the amplitude of the tactile signal is assumed to be the amplitude by the rise height A (hereinafter referred to as an "amplitude A") at the time of the pre-drive.

Figure 7:
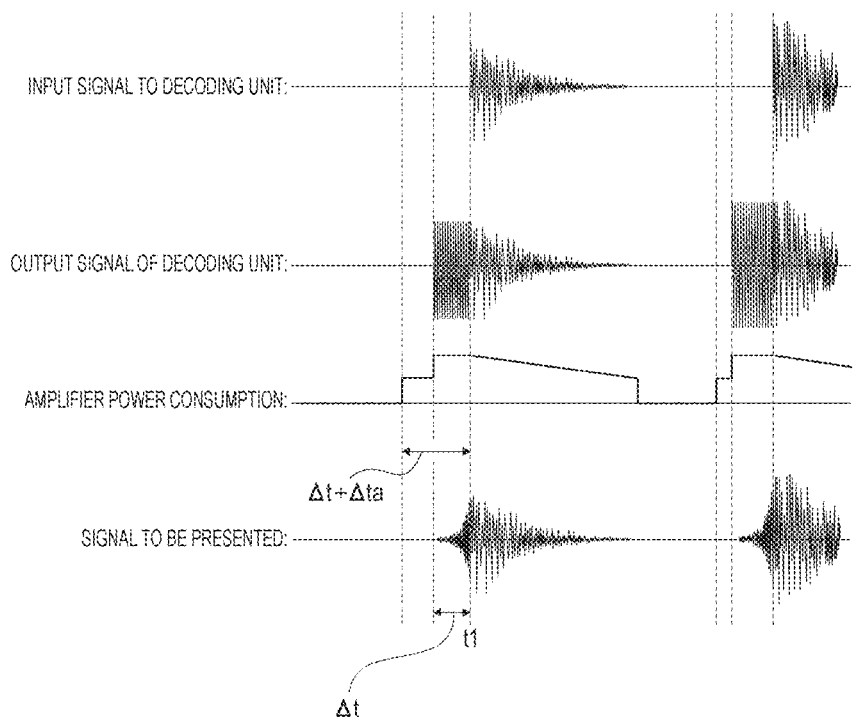
FIG. 7 is a view showing an example of drive by a drive method as an embodiment.

FIG. 7 shows an example of drive.

According to the drive method described above, the amplifier 31 is started up before Δt+Δta with respect to the rise timing of the tactile signal represented by the time t1, and for the tactile presentation device 6, the pre-drive is started before Δt with respect to the time t1. In this example, the amplitude of the tactile signal at the time of the pre-drive is the amplitude A.

By such pre-drive, the signal presented by the tactile presentation device 6 reaches the amplitude A at the time t1. Therefore, the timing at which the tactile stimulation has the maximum amplitude can be matched with the original timing at which the tactile signal has the maximum amplitude. That is, the moment of the maximum amplitude having a large perceptual influence can be matched with the original time.

After the rise at the time t1, the amplifier 31 is switched to the power saving state again in response to a sufficient attenuation of the tactile signal. As a result, the power consumption of the amplifier 31 is reduced.

Here, the moment at which the time T until rise becomes 0 is the original rise time, and hence the tactile presentation device 6 is driven thereafter in accordance with the original amplitude of the tactile signal.

In the frame Fr on and after the rise time, the information regarding the time T indicating the remaining time until a next rise time, and the information regarding the height A related to the next rise time are newly stored in the header. At this time, the amplifier 31 is brought into the power saving state in a case where the amplitude of the tactile signal is sufficiently small and there is a time until the next rise, specifically, for example, the time T until rise is greater than Δt+Δta.

Application Example

It is conceivable that the drive method described above is applied to a case of viewing a movie with vibration using a portable terminal such as a smartphone.

For example, let the reproduction device 3 be a portable terminal having a built-in tactile presentation device 7 as a vibration device. An eccentric motor is often used as a vibration device for smartphones and the like from the viewpoint of cost. However, it takes a time of about 100 ms for an eccentric motor to reach the desired amplitude from the amplitude of 0, and the responsiveness is low. Hence, even if the eccentric motor is driven using the tactile signal as it is, the tactile presentation timing is delayed by 100 ms compared with that originally desired. This means that the vibration is delayed more than the video and audio of the movie, which becomes a factor that greatly spoils the user experience.

Therefore, it is preferable to apply the drive method of the present embodiment. In this case, the vibration of the eccentric motor is started 100 ms before the original signal rise timing. Furthermore, the amplifier 31 is started up, for example, 120 ms prior to it.

Therefore, even in a case where an eccentric motor having low responsiveness is used, it is possible to prevent the tactile presentation timing from being delayed, and it is possible to improve the reproducibility of the tactile sense. Furthermore, by providing a time for the amplifier 31 to be brought into the power saving state, it is possible to reduce power consumption necessary for tactile presentation.

(Configuration on Encoding Side)

Figure 8:
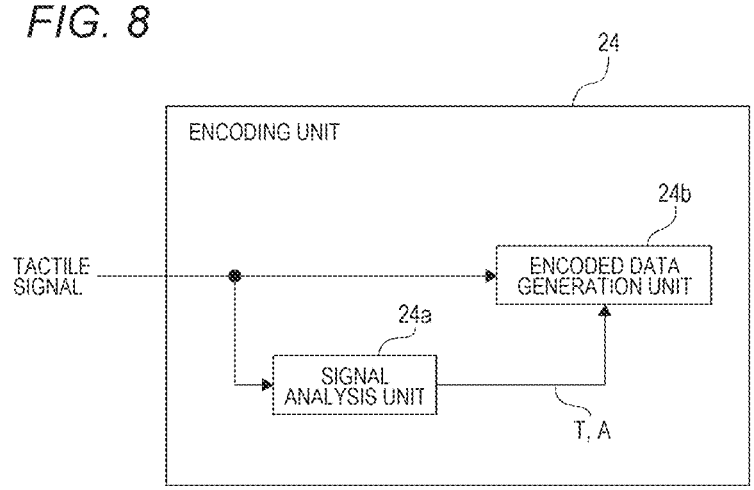
FIG. 8 is a diagram showing an internal configuration example of an encoding unit for realizing a drive method as an embodiment.

FIG. 8 is a diagram showing an internal configuration example of the encoding unit 24 for realizing a drive method as an embodiment described above.

As illustrated, the encoding unit 24 includes a signal analysis unit 24a and an encoded data generation unit 24b. The signal analysis unit 24a performs a signal analysis on the tactile signal to be input from the preprocessing unit 23 shown in FIG. 2, and obtains the "time T until rise" and the "rise height A" for the target frame Fr.

The encoded data generation unit 24b generates the encoded data Dc on the basis of the tactile signal to be input from the preprocessing unit 23 and the "time T until rise" and the "rise height A" obtained by the signal analysis unit 24a. Specifically, in accordance with the encoding format described with reference to FIG. 6, the encoded data generation unit 24b generates the encoded data Dc in which predetermined information such as the time T until rise and the rise height A are stored in the header.

(Function Configuration on Decoding Side)

Figure 9:
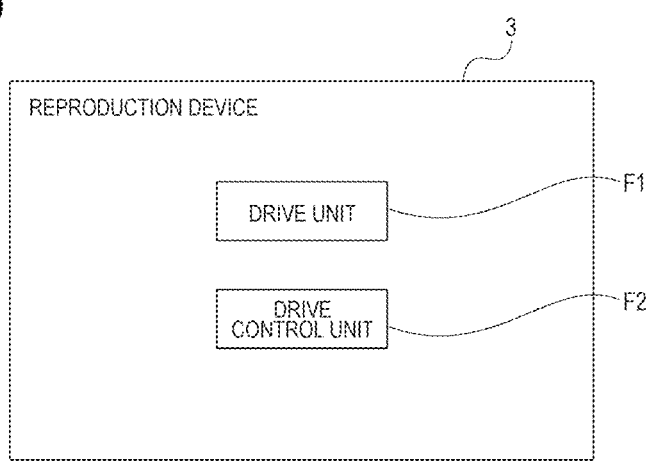
FIG. 9 is a function block diagram of a drive control device for explaining a function related to a drive method as an embodiment.

FIG. 9 is a function block diagram for explaining the function related to the drive method as an embodiment included in the reproduction device 3.

As illustrated, the reproduction device 3 has a function as a drive unit F1 and a drive control unit F2.

The drive unit F1 drives the tactile presentation device 6 by a drive signal based on the tactile signal, and in this example, the drive unit F1 corresponds to the D/A converter 32 and the amplifier 31.

The drive control unit F2 causes the drive unit F1 to execute a pre-drive, which is to drive the tactile presentation device 6 in advance with respect to the rise timing of the tactile signal. In this example, the function as the drive control unit F2 is implemented by the decoding unit 34.

In this example, the drive control unit F2 starts the pre-drive at a timing corresponding to the responsiveness of the tactile presentation device 6. This makes it possible to set a timing at which a tactile presentation is actually started to a timing corresponding to a responsiveness of a tactile presentation device.

Furthermore, the drive control unit F2 of this example starts the pre-drive at a timing corresponding to the rise height A of the tactile signal. This makes it possible to set a timing at which a tactile presentation is actually started to a timing corresponding to a rise height of a tactile signal.

Furthermore, the drive control unit F2 in this example causes the drive unit F1 to execute the pre-drive on the basis of the timing-related information accompanying the tactile signal by encoding.

Here, the timing-related information is information related to the timing of the pre-drive, and in this example, the timing-related information corresponds to the information regarding the "time T until rise" representing the rise timing of the tactile signal and the information regarding the "rise height A" of the tactile signal.

By executing the pre-drive on the basis of the timing-related information accompanying the tactile signal by encoding, it is not necessary to analyze the tactile signal on the decoding side when executing the pre-drive at an appropriate timing. That is, it is possible to reduce the processing load on the decoding side.

Furthermore, the drive control unit F2 in this example executes the pre-drive by the drive signal strength corresponding to the rise height A of the tactile signal.

This makes it possible to prevent a delay of a presentation timing to the toucher at the moment of the maximum amplitude at a rise portion of a tactile signal.

Further, in the reproduction device 3 of this example, the drive unit F1 drives the tactile presentation device 6 by the drive signal amplified by the amplifier 31, and the drive control unit F2 performs control of bringing the amplifier 31 into the power saving state on the basis of the amplitude value of the tactile signal, and performs control of bringing the amplifier 31 into the start-up state on the basis of the start timing of the pre-drive.

This makes it possible to reduce power consumption caused by bringing the amplifier 31 into a power saving state in a period other than a rise portion of a tactile signal in response to a case where a rise portion of a tactile signal exists discretely in a time direction, and to bring the amplifier 31 into a start-up state before a start timing of a pre-drive. Therefore, it is possible to improve the reproducibility of the tactile sense by pre-drive while reducing power consumption.

Note that in this example, an example in which the drive unit F1 and the drive control unit F2 are integrally configured in the same device as the reproduction device 3 is described, but a configuration in which the drive unit F1 is provided in a separate device from the drive control unit F2 is possible.

(Processing Procedure on Decoding Side)

With reference to the flowchart of FIG. 10, the procedure of the processing to be executed by the reproduction device 3 in order to implement the drive method as the embodiment described above will be described.

Figure 10:
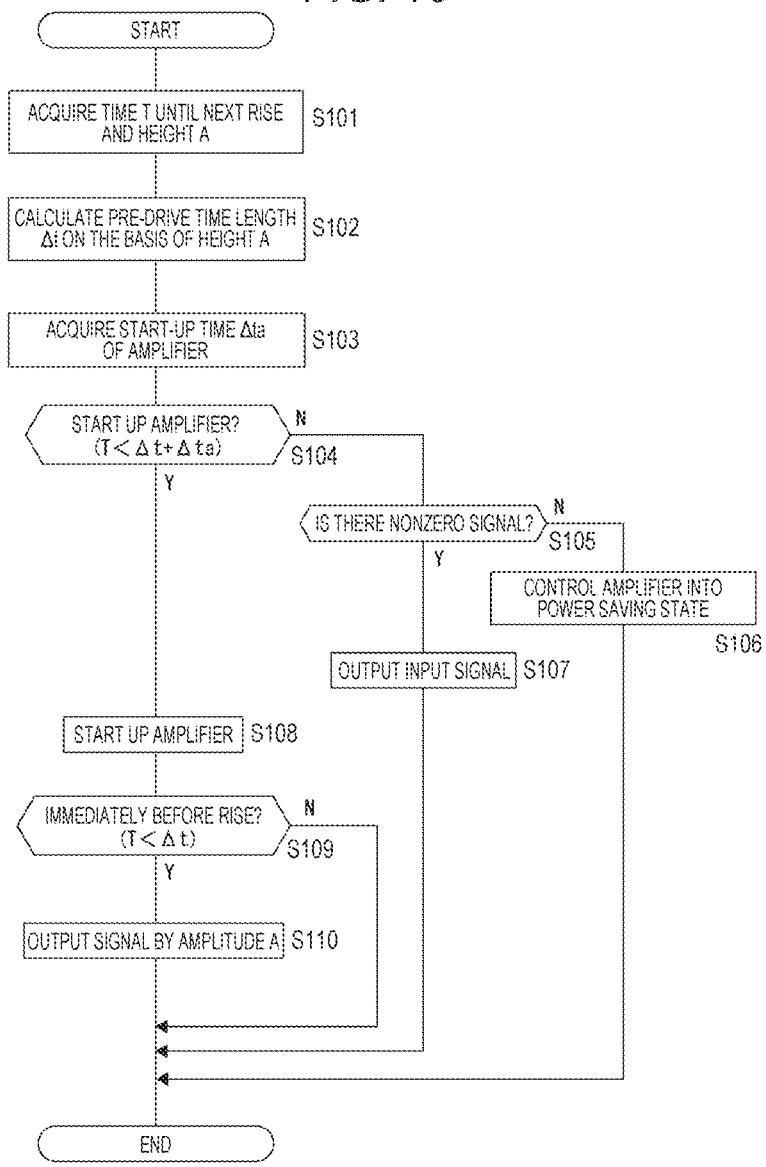
FIG. 10 is a flowchart showing a specific processing procedure to be executed in order to realize a drive method as an embodiment.

Note that the processing shown in FIG. 10 is executed by the decoding unit 34 for every frame Fr of the encoded data Dc.

In FIG. 10, the decoding unit 34 performs in step S101 processing of acquiring the time T until the next rise and the rise height A. That is, the decoding unit 34 acquires information regarding the time T until rise and the rise height A stored in the header of the target frame Fr.

In subsequent step S102, the decoding unit 34 calculates the time length $\Delta t$ of the pre-drive on the basis of the rise height A, and performs in the next step S103 processing of acquiring the start-up time $\Delta ta$ of the amplifier 31. As described above, the time length $\Delta t$ of the pre-drive is calculated in this example by using the coefficient indicating the responsiveness of the tactile presentation device 6 and the rise height A.

Note that the start-up time $\Delta ta$ of the amplifier 31 can be obtained dynamically with respect to the rise height A, and in that case, it is obtained by calculation using the height A.

In step S104, following step S103, the decoding unit 34 determines whether or not to start up the amplifier 31, specifically, whether or not it is "$T<\Delta t+\Delta ta$".

In a case where the decoding unit 34 determines that it is not "$T<\Delta t+\Delta ta$" and the amplifier 31 should not be started up yet, the decoding unit 34 determines in step S105 whether or not there is a nonzero signal.

Here, a case where it is not "$T<\Delta t+\Delta ta$", i.e., a case in which there is sufficient time until the next rise, is considered to be either a case in the middle of a non-signal period between rise portions of a signal or a case in the middle of a period on and after the rise timing in a rise portion of a signal. The determination processing in step S105 functions as processing of sorting as to which of these two cases to apply.

In a case of determining in step S105 that there is no nonzero signal (i.e., in a case of a non-signal period), the decoding unit 34 controls in step S106 the amplifier 31 to be brought into the power saving state and ends the series of processing shown in FIG. 10.

Therefore, in the non-signal period excluding the rise portion of the tactile signal, the amplifier 31 is prevented from unreasonably consuming power, thereby reducing power consumption.

On the other hand, in a case of determining in step S105 that there is a nonzero signal, the decoding unit 34 outputs an input signal in step S107. That is, the decoding unit 34 outputs the tactile signal stored in the real data region in the frame Fr. In response to the execution of the output processing in step S105, the decoding unit 34 ends the series of processing shown in FIG. 10.

Here, the rise of the tactile signal occurs independently of the break of the frame Fr, and it is rare that the rise timing of the tactile signal coincides with the break of the frame Fr. Assuming that the target rise timing in the tactile signal is a "rise timing Tt" and that the frame Fr including the rise timing Tt is the m-th frame Fr (hereinafter referred to as a frame Fr(m)), in the encoding by the encoding unit 24, the "time T until rise" for the rise timing Tt is stored up to the frame Fr(m), and the "time T until rise" for the rise timing subsequent to the rise timing Tt is stored from the frame Fr (m+1) subsequent to the frame Fr(m).

According to the processing in steps from S105 to S107, in response to the case where the frame Fr to be processed is the frame Fr (m+1), it is possible to appropriately output the signal in the nonzero period at the rise portion. Furthermore, this means that switching is appropriately performed from the output of the amplitude A as the pre-drive to the signal output in the nonzero period at the rise portion.

Subsequently, in a case of determining in the previous step S104 that it is "T<Δt+Δta" and the amplifier 31 should be started up, the decoding unit 34 performs in step S108 control of starting up the amplifier 31, and then determines in step S109 whether or not it is immediately before rise, specifically, whether or not it is "T<Δt".

In a case of determining that it is not "T<Δt" and it is not immediately before rise, the decoding unit 34 ends the series of processing shown in FIG. 10.

On the other hand, in a case of determining that it is "T<Δt" and it is immediately before rise, the decoding unit 34 outputs in step S110 the signal having the amplitude A, and ends the series of processing shown in FIG. 10. Therefore, the pre-drive is performed from the frame Fr where it has become "T<Δt" to the frame Fr(m) described above.

[1-5. First Variation]

Here, the processing shown in FIG. 10 is an example of determining the start timing of the pre-drive in units of frames of the tactile signal. According to this, for example, if the time length of the frame Fr determined from the number of samples included in the frame Fr and the sampling frequency (e.g., if the number of samples=128 and the sampling frequency=2 kHz, it is 64 ms) is sufficiently short, it is possible to sufficiently exhibit the delay reduction effect of the tactile presentation timing.

On the other hand, the determination of the start timing of the pre-drive can be performed in units of samples. Therefore, even if the time length of the frame Fr is long, it is possible to perform determination with high time resolution.

Figure 11:
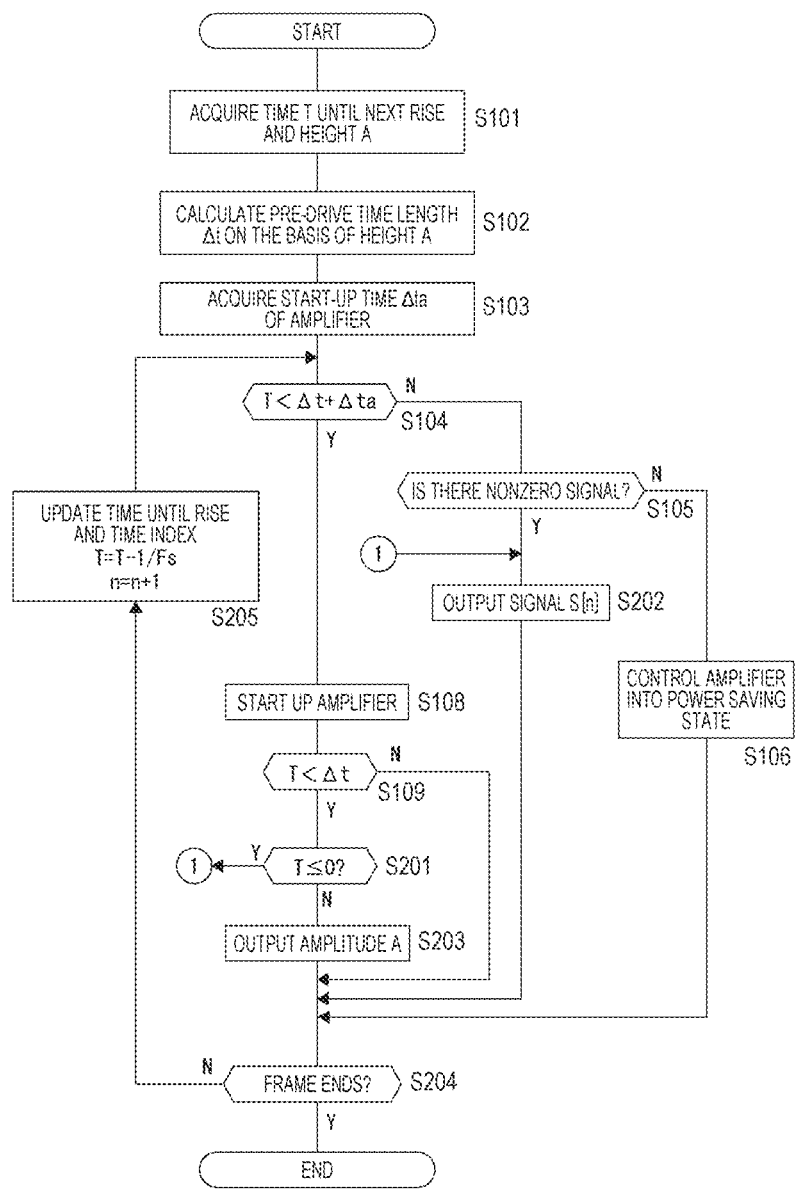
FIG. 11 is a flowchart showing a processing procedure as a first variation.

FIG. 11 shows an example of a specific processing procedure.

Note that in the following description, similar parts and processing to those described so far are given the same reference numerals and the same step numbers to avoid duplicate explanations.

In FIG. 11, the difference from FIG. 10 is that steps S202 and S203 are executed instead of steps S107 and S110, and steps S201, S204, and S205 are added.

First, in a case of determining in step S105 that there is a nonzero signal, the decoding unit 34 in this case executes processing of outputting a signal S[n] in step S202, and then proceeds to step S204.

Here, "n" is a time index indicating as to what number of the sample of the tactile signal, and the signal S[n] means a value of the nth sample of the tactile signal.

In step S204, the decoding unit 34 determines whether or not the frame has ended, i.e., whether the processing has been executed up to the final sample of the frame Fr to be processed, and in a case of determining that the frame has not ended, the decoding unit 34 executes in step S205 the processing of updating the time T until rise and the time index n, and returns to step S104.

Here, the time T until rise is updated by "T=T−1/Fs", where the sampling frequency of the tactile signal is "Fs".

Furthermore, in a case of determining in step S109 that it is "T<Δt", the decoding unit 34 in this case determines in step S201 whether or not it is "T≤0". This corresponds to determination as to whether or not the time indicated by the time index n is a time on and after the target rise time in the tactile signal.

If it is not "T≤0" in step S201, the decoding unit 34 outputs in step S203 the amplitude A, and proceeds to step S204. Therefore, it is possible to perform the pre-drive having the amplitude A from it becomes "T<Δt" to immediately before "T≤0".

On the other hand, if it is "T≤0", the decoding unit 34 outputs the signal S[n] in step S202. Therefore, it is possible to output a nonzero signal at the rise portion on and after the rise time.

By the processing shown in FIG. 11, it is possible to determine the start timing of the pre-drive in units of samples of the tactile signal.

This makes it possible to improve an accuracy of a start timing of a pre-drive. That is, it is possible to increase the matching accuracy between the timing at which tactile presentation is actually started and the original timing.

[1-6. Second Variation]

Here, in the above example, the amplitude of the tactile signal at the time of the pre-drive is matched with the rise height A. That is, an example in which the drive signal strength of the pre-drive is set to the strength corresponding to the rise height A has been given.

Figure 12:
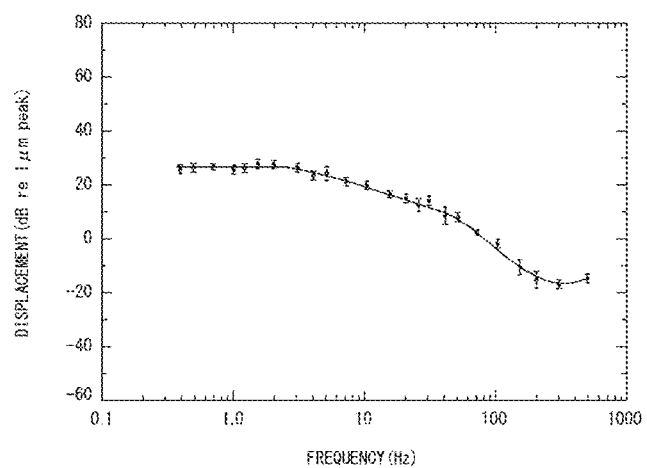
FIG. 12 is an explanatory view of a vibration detection threshold value curve.

However, in a case where it is desired to match not the moment of maximum amplitude but the timing at which the toucher starts to perceive the tactile stimulation, it is effective to perform the pre-drive with an amplitude in accordance with the vibration detection threshold value curve as shown in FIG. 12.

FIG. 12 shows a vibration detection threshold value curve indicating a standard of the human tactile sensitivity related to vibration. Note that in FIG. 12, the horizontal axis represents the frequency, and the vertical axis represents the magnitude of tactile stimulation (vibration: displacement here).

The vibration detection threshold value curve is an experimentally examined example of whether or not the human feels the vibration as a tactile sense, i.e., the tactile sensitivity. The human cannot perceive vibrations smaller than this curve as a tactile sense.

Therefore, the pre-drive is performed with an amplitude equal to or smaller than the threshold value represented by such vibration detection threshold value curve.

Figure 13:
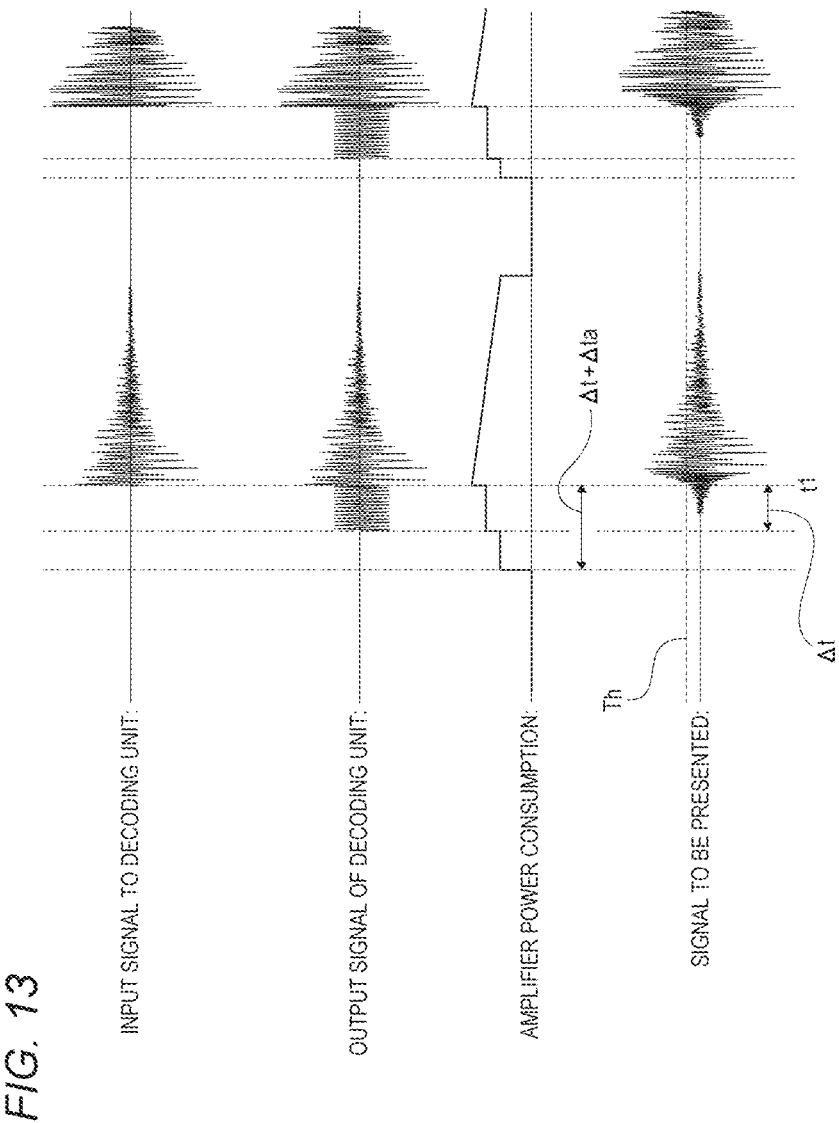
FIG. 13 is a view of an example of drive in a second variation.

FIG. 13 shows an example of drive. As illustrated, the signal presented in this case does not exceed the vibration detection threshold value represented as a threshold value Th in the figure in the period of the pre-drive.

With such drive, the vibration is not felt at a timing earlier than the original rise time t1 of the tactile signal, yet the time required to reach the desired vibration strength can be shortened compared with vibrating from the state of the amplitude 0, and hence it is also possible to reduce the moment of the maximum amplitude of the presented vibration, i.e., the deviation from the time t1.

Note that although an example of the human perception threshold value related to vibration as the vibration detection threshold value has been given, a perception threshold value similarly exists for tactile stimulation other than vibration.

In a case where the rise time for the strength of the presented tactile stimulation to reach the strength corresponding to the perception threshold value is so short that it does not need to be taken into consideration, the time length Δt of the pre-drive can also be predetermined as a constant value. Alternatively, the time length Δt can also be determined in accordance with the magnitude of the perception threshold value.

Here, as in the threshold value curve for vibration illustrated in FIG. 12, the perception threshold value may vary depending on the frequency. In this case, the decoding unit 34 performs signal analysis on the tactile signal to specify a main frequency component of the rise portion, and executes the pre-drive with an amplitude (drive signal strength) in accordance with a perception threshold value corresponding to the frequency component.

Alternatively, it is possible to skip specification of such a frequency component, and to match the amplitude at the time of the pre-drive with the lowest threshold value of the perception threshold values (e.g., in the example of FIG. 12, the threshold value is matched with a threshold value near 300 Hz).

[1-7. Third Variation]

The third variation relates to a method in which the characteristics of receptors of the human body are considered.

It is generally known that there is a plurality of receptors for perceiving tactile information beneath the human skin. Typically known receptors include Meissner's corpuscles (hereinafter abbreviated as "Meissner"), Merkel cells (Hereinafter abbreviated as "Merkel"), Ruffini endings (Hereinafter abbreviated as "Ruffini"), and Pacinian corpuscles (Hereinafter abbreviated as "Pacinian").

Meissner and Pacinian are also called "FA1" and "FA2", respectively, where FA is an abbreviation for "Fast Adapting". Merkel and Ruffini are also called "SA1" and "SA2", respectively, where SA is the abbreviation for "Slow Adapting".

Merkel (SA1) continues to fire its nerves while pressing an object, and is said to be detecting the strength (displacement and pressure). Meissner (FA1) is said to be detecting the speed in a section where the push amount of an object becomes constant. Pacinian (FA2) is said to be responsible for detection of acceleration in a section where the push change amount changes.

Figure 14:
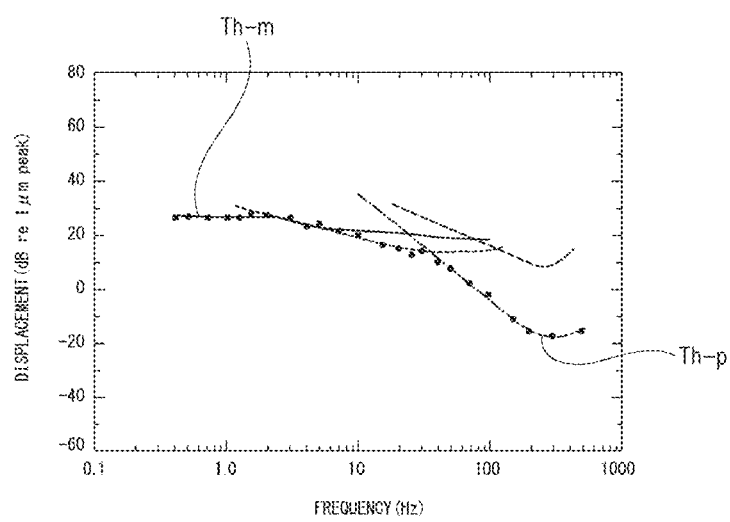
FIG. 14 is a view showing a vibration detection threshold value curve for every receptor.

FIG. 14 shows a vibration detection threshold value curve for every receptor.

In the figure, a threshold value Th-m indicated by the solid line represents a vibration detection threshold value of Merkel, and a threshold value Th-p indicated by the dashed line represents a vibration detection threshold value of Pacinian. Note that the vibration detection threshold value curve shown in FIG. 12 does not show the characteristics of a single receptor, but shows the synthesized characteristics of tactile sense obtained by a plurality of receptors as shown in FIG. 14.

As shown in FIG. 14, the vibration detection threshold value curve varies depending on the receptor. Use of this characteristics also allows the time length Δt of the pre-drive (start timing of pre-drive) and the amplitude at the time of the pre-drive (drive signal strength of pre-drive) to be dynamically determined on the basis of the main frequency components at the rise portion of the tactile signal and the characteristics of the receptors.

As a specific example, Merkel, indicated by the threshold value Th-m, has a relatively high perception threshold value. Moreover, Merkel has a low time responsiveness. Therefore, in a case where the rise portion of the tactile signal mainly includes low frequency components (e.g., 3 to 2 Hz or less), the tactile stimulation corresponding to the rise portion is deemed to be perceived mainly by Merkel, the tactile presentation device 6 may be vibrated largely in advance, and a slight deviation of the stimulation presentation timing is allowed.

On the other hand, Pacinian, indicated by the threshold value Th-p, has a low perception threshold value in a relatively high frequency band of about 200 Hz, and exhibits good sensitivity. Moreover, Pacinian has high time responsiveness. Therefore, in a case where the rise portion of the tactile signal mainly includes high frequency components (e.g., 200 Hz or higher), the tactile stimulation corresponding to the rise portion is deemed to be perceived mainly by Pacinian, and the amplitude at the time of the pre-drive is reduced.

Here, it is conceivable that the encoding unit 24 performs the signal analysis for identifying the main receptor that perceives the tactile stimulation at the rise portion. In that case, the encoding unit 24 stores information indicating a main receptor that perceives tactile stimulation of the target rise portion for the header of the frame Fr, for example. On the basis of information indicating the main receptor, the decoding unit 34 determines the time length Δt of the pre-drive and the amplitude at the time of the pre-drive.

Note that the signal analysis for identifying the main receptor that perceives the tactile stimulation can also be performed on the decoding unit 34 side.

[1-8. Fourth Variation]

The description so far has been assumed that the time length Δt of the pre-drive and the amplitude of the pre-drive are calculated and acquired in a predetermined manner by the decoding unit 34, but the time length Δt of the pre-drive and the amplitude at the time of the pre-drive may be adjustable by operation to the user such as a toucher.

Figure 15:
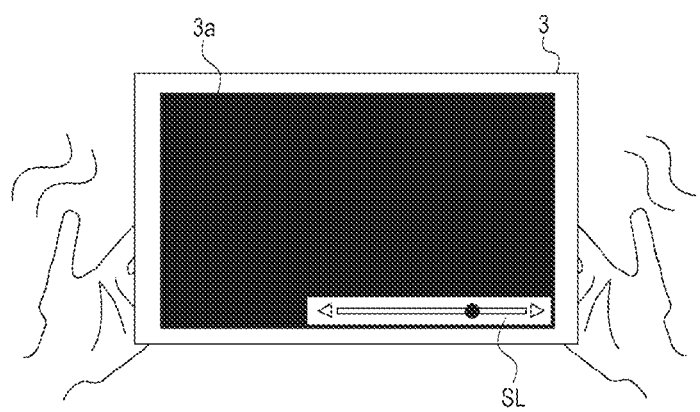
FIG. 15 is a view showing an example of a GUI for adjusting the start timing of a pre-drive and the drive signal strength.

FIG. 15 shows an example of the graphical user interface (GUI) for adjustment.

Specifically, FIG. 15 shows an example of the GUI in a case where the reproduction device 3 has a display device such as a liquid crystal display or an organic electroluminescence (EL) display, and a touch screen operator formed on a display screen 3a of the display device. This figure shows an example of a configuration in which a slider operator SL displayed on the display screen 3a can adjust the length of the time length Δt of the pre-drive or the magnitude of the amplitude at the time of the pre-drive.

This makes it possible to correspond to the user's preference and the tolerance degree of the deviation of the tactile stimulation timing.

2. SECOND EMBODIMENT

[2-1. Configuration of Tactile Reproduction System]

Next, the second embodiment will be described.

In the second embodiment, a plurality of the tactile sensors 5 and the tactile presentation devices 6 are provided to handle tactile signals of a plurality of channels.

Figure 16:
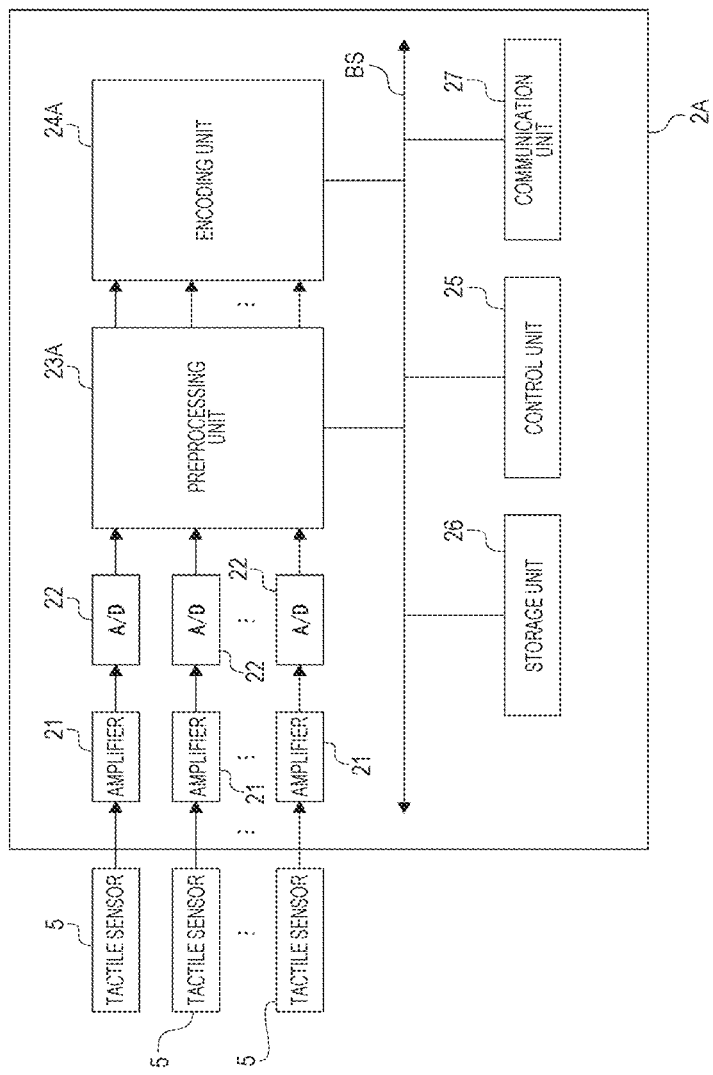
FIG. 16 is a diagram for explaining an internal configuration example of the encoding device as a second embodiment.

FIG. 16 is a diagram for explaining an internal configuration example of an encoding device 2A as the second embodiment, and shows the plurality of tactile sensors 5 together with the internal configuration example of the encoding device 2A.

The difference from the encoding device 2 shown in FIG. 2 is that, corresponding to the provision of the plurality of tactile sensors 5, the amplifier 21 and the A/D converter 22 are provided for every tactile sensor 5, and a preprocessing unit 23A and an encoding unit 24A are provided in place of the preprocessing unit 23 and the encoding unit 24.

The preprocessing unit 23A inputs a tactile signal by a digital signal output from each A/D converter 22, and performs the similar signal processing to that of the preprocessing unit 23 for each tactile signal.

The encoding unit 24A inputs each tactile signal having been subjected to the processing by the preprocessing unit 23A, and performs the similar encoding to that of the encoding unit 24 for the tactile signals. The encoded data Dc in this case can be independent data for each channel of a tactile signal, or can be data obtained by time-division multiplexing the tactile signal of every channel in one stream.

The following description assumes that the encoded data Dc generated by the encoding unit 24A is the stream data of the latter. In this case, in the stream data, for every frame Fr of each channel, information regarding the time T until rise and the rise height A is stored in the header.

Figure 17:
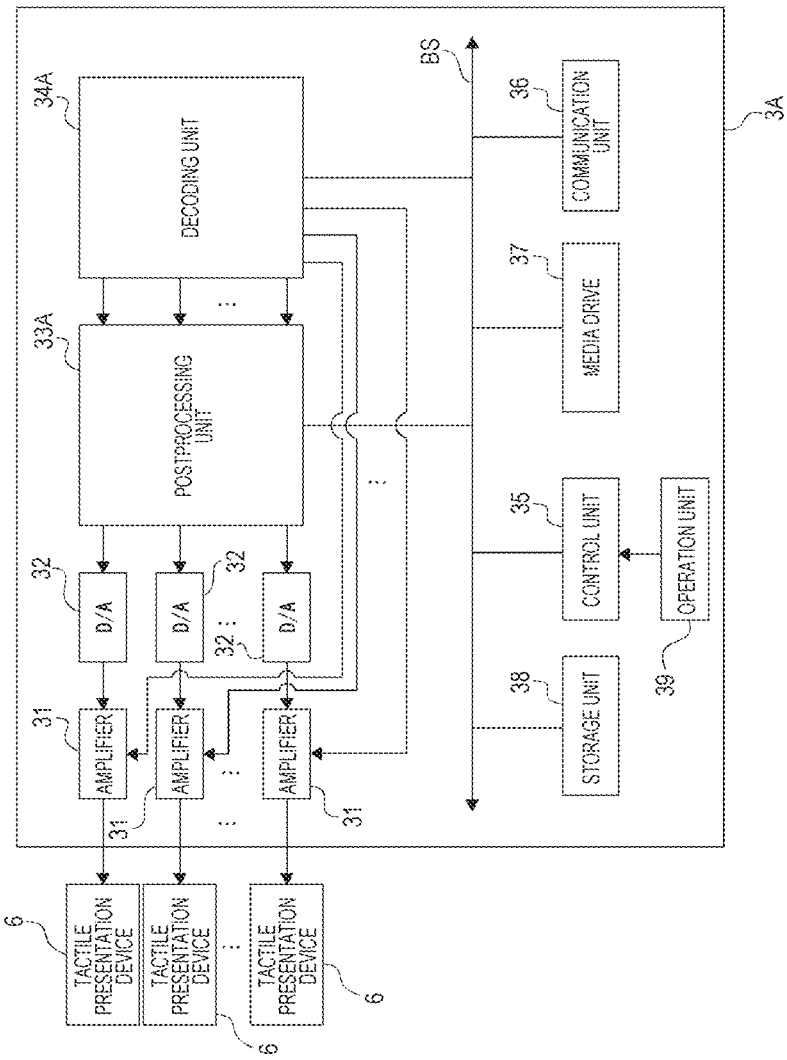
FIG. 17 is a diagram for explaining an internal configuration example of the drive control device as the second embodiment.

FIG. 17 is a diagram for explaining an internal configuration example of a reproduction device 3A as the second embodiment, and shows the plurality of tactile presentation devices 6 together with the internal configuration example of the reproduction device 3A.

The difference from the reproduction device 3 illustrated in FIG. 3 is that, corresponding to the provision of a plurality of the tactile presentation devices 6, the amplifier 31 and the D/A converter 32 are provided for every tactile presentation device 6, and a postprocessing unit 33A and a decoding unit 34A are provided in place of the postprocessing unit 33 and the decoding unit 34.

On the basis of the data of the frame Fr for every channel in the encoded data Dc, the decoding unit 34A performs the similar decoding to that of the decoding unit 34 for every channel to realize the pre-drive for every channel, and performs power saving control of the amplifier 31 for every channel.

The postprocessing unit 33A performs the similar signal processing to that of the postprocessing unit 33 for the tactile signal of each channel to be output from the decoding unit 34A, and outputs each tactile signal to the D/A converter 32 of the corresponding channel.

The tactile signal of each channel is converted into an analog signal by the D/A converter 32 of the corresponding channel, and then output to the tactile presentation device 6 of the corresponding channel via the amplifier 31 of the corresponding channel.

[2-2. First Application Example]

Here, since the human tactile sense is felt over a wide range of the entire body, it is conceivable to use a large number of the tactile presentation devices 6 for stimulating the wide range also in presentation of the tactile sense, and to present a wide band of tactile information by combining the plurality of tactile presentation devices 6 having different frequency characteristics in order to present more various tactile senses.

Figure 18:
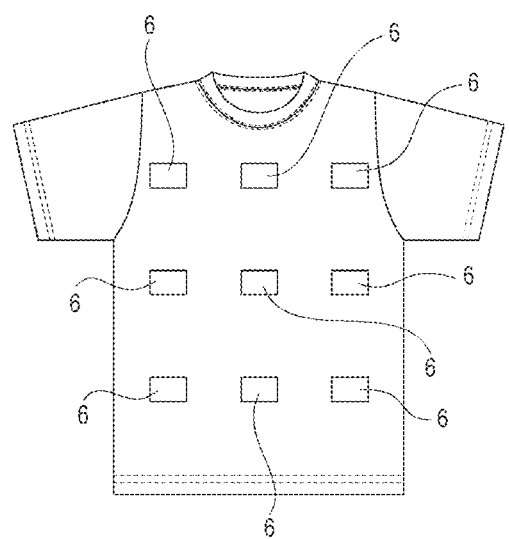
FIG. 18 is a view showing an example of a torso presentation type tactile device.

Here, as a case of combined use of such different types of tactile presentation devices 6, an example of use of a torso presentation type tactile device as shown in FIG. 18 will be shown.

In this torso presentation type tactile device, each tactile presentation device 6 is disposed so as to be capable of presenting tactile stimulation to different sites in the torso of the human body. It is desirable that as many tactile presentation devices 6 as possible be disposed so that tactile information can be presented over a wide region of the body.

Note that although FIG. 18 gives an example of a T-shirt type tactile device, it is possible to adopt a tactile device of another shape such as a jacket type.

At present, the tactile presentation device 6 as a vibration device in particular can only output vibrations in a narrow frequency band by itself, and in order to present tactile information with higher reality, it is conceivable to use the tactile presentation devices 6 having different frequency characteristics in combination, such as a linear actuator excellent in output of a low frequency and a piezoelectric element (piezo element) excellent in output of a high frequency.

At this time, since the time responsiveness is different between the different tactile presentation devices 6 having different frequency characteristics, the actual tactile timings can vary depending on the tactile presentation devices 6 even if the tactile signals of the tactile presentation devices 6 have a synchronized rise timing.

The drive method as the embodiment is effective also in preventing the deviation of the tactile presentation timing between the tactile presentation devices 6 of such different types.

Specifically, corresponding to the case where the different types of tactile presentation devices 6 are used in a mixed manner, the decoding unit 34A obtains the time length Δt corresponding to the responsiveness of the tactile presentation device 6 to be used for every channel. That is, for a channel in which a linear actuator is used as the tactile presentation device 6, the time length Δt is calculated on the basis of the responsiveness and the rise height A of the linear actuator. Furthermore, for a channel in which a piezoelectric element (considered to be higher in responsive than the linear actuator) is used as the tactile presentation device 6, the time length Δt is calculated on the basis of the responsiveness and the rise height A of the piezoelectric element.

Thus, by obtaining the time length Δt of the pre-drive in accordance with the type (responsiveness) of the tactile presentation device 6 to be used, it is possible to prevent an occurrence of variations in the tactile presentation timing among the tactile presentation devices 6 in spite of the synchronization of the rise timing on the tactile signal side. That is, the tactile presentation timing is synchronized among the different types of tactile presentation devices 6.

Note that as shown in FIG. 18, each of the different types of tactile presentation devices 6 can not only be disposed so as to give tactile stimulation to different sites of the human body, but also be disposed so as to give tactile stimulation to the same sites.

Furthermore, in the second embodiment, the amplitude (drive signal strength) at the time of the pre-drive may be changed in accordance with the type (responsiveness) of the tactile presentation device 6 to be used.

[2-3. Second Application Example]

Here, the different types of tactile presentation devices 6 having different frequency characteristics can give tactile stimulation to receptors different from each other.

For example, Merkel, Meissner, and Pacinian receptors have different frequency bands where good response is exhibited. It is generally said that Merkel responds well in the low frequency, Meissner responds well in the middle frequency, and Pacinian responds well in the high frequency. Although the characteristics of these receptors do not necessarily respond only to clearly divided bands, it is conceivable that as an example, the low frequency is defined as less than 3 Hz in accordance with Merkel's characteristics, the middle frequency as 3 Hz or more and less than 40 Hz in accordance with Meissner's characteristics, and the high frequency as 40 Hz or more and 1000 Hz or less in accordance with Pacinian's characteristics.

In this case, for the tactile presentation devices 6, three types of tactile presentation devices 6 for Merkel, Meissner, and Pacinian exhibiting good sensitivity in the low, middle, and high frequencies, respectively, are used.

The pre-drive of every of the different types of tactile presentation devices 6 can be performed by varying the drive signal strength and the start timing in accordance with the characteristics of the target receptor, specifically, the perception threshold value and the time responsiveness.

For example, the encoding unit 24A records, in the header of the frame Fr, for every channel, identification information for identifying a receptor targeted by the tactile presentation device 6 of that channel. On the basis of the identification information, the decoding unit 34A executes the pre-drive with the drive signal strength and the start timing corresponding to the receptor for every channel.

Alternatively, it is not essential to store the identification information in the encoded data Dc by encoding, and it is also possible to adopt a configuration in which, on the basis of the signal analysis of the tactile signal, the decoding unit 34A specifies which receptor a tactile signal is directed to, and executes the pre-drive with the drive signal strength and the start timing corresponding to the specified receptor.

Therefore, the pre-drive of every tactile presentation device 6 can be performed in an appropriate mode corresponding to the characteristics of the target receptor, and it is possible to improve the reproducibility of the tactile sense.

In particular, for a vibration device or the like, it is difficult to implement the tactile presentation device 6 that exhibits good sensitivity in a wide band from a low frequency to a high frequency, and therefore, use of the tactile presentation device 6 having different frequency characteristics for every receptor as in this example is effective in improving the reproducibility of the tactile sense.

[2-4. Third Application Example]

Human tactile characteristics can vary from site to site, and perception threshold values such as vibration detection threshold values can also vary in different sites such as the back and upper arms.

Therefore, it is also possible to make the amplitude (drive signal strength) at the time of the pre-drive variable in accordance with the site of the human body to which the tactile presentation device 6 is mounted. In this case, the encoding unit 24A records, in the header of the frame Fr, for every channel, identification information for identifying a site to which the tactile presentation device 6 of the channel is mounted. On the basis of the identification information, the decoding unit 34A executes the pre-drive with the drive signal strength corresponding to the mounting site for every channel.

Therefore, the pre-drive of every tactile presentation device 6 can be performed in an appropriate mode corresponding to the tactile characteristics of the target body site, and it is possible to improve the reproducibility of the tactile sense.

3. VARIATIONS

Note that although the example of obtaining the time length Δt of the pre-drive and the start-up time Δta of the amplifier 31 on the decoding unit 34 (34A) side has been described above, it is also possible to obtain such information on the encoding unit 24 (24A) side on the basis of the signal analysis of the tactile signal, and record it into the encoded data Dc, and the decoding unit 34 (34A) performs the pre-drive and the control of the amplifier 31 on the basis of such stored information.

Furthermore, although a vibration device is exemplified as the tactile presentation device 6 in the above description, it is also possible to use, as the tactile presentation device 6, a device that performs tactile presentation by means other than vibration, such as, for example, a device that performs tactile stimulation by air flow or direct stimulation of a nerve by electricity, or a device that gives tactile stimulation by ultrasonic waves. In particular, as the tactile presentation device 6 that discharges air, one that has a pump for discharging air is low in responsiveness, and the present technology can be preferably applied.

4. SUMMARY OF EMBODIMENTS

As described above, the drive control device (reproduction devices 3 and 3A) as an embodiment includes the drive control unit (F2 and the decoding units 34 and 34A) that causes the drive unit (F1 and the amplifier 31) that drives the tactile presentation device by a drive signal based on the tactile signal to execute a pre-drive, which is to drive the tactile presentation device in advance with respect to the rise timing of the tactile signal.

By the pre-drive described above, a timing at which a tactile presentation is actually started can be brought close to a rise timing of a tactile signal.

Therefore, it is possible to prevent delay in tactile presentation timing due to the responsiveness of the tactile presentation device, and it is possible to improve the reproducibility of the tactile sense.

Furthermore, in a case where tactile presentation devices having different responsiveness such as an eccentric motor and a piezoelectric element are used in combination, it is possible to absorb the difference in the response time between them and to synchronize the presentation stimulation.

Furthermore, in the drive control device as an embodiment, the drive control unit starts the pre-drive at a timing corresponding to the responsiveness of the tactile presentation device.

This makes it possible to set a timing at which a tactile presentation is actually started to a timing corresponding to a responsiveness of a tactile presentation device.

Therefore, it is possible to prevent delay in tactile presentation timing due to the responsiveness of the tactile presentation device, and it is possible to improve the reproducibility of the tactile sense.

Furthermore, in the drive control device as an embodiment, the drive control unit starts the pre-drive at a timing corresponding to the rise height of the tactile signal.

This makes it possible to set a timing at which a tactile presentation is actually started to a timing corresponding to a rise height of a tactile signal.

Therefore, it is possible to prevent delay in tactile presentation timing due to the responsiveness of the tactile presentation device, and it is possible to improve the reproducibility of the tactile sense.

Furthermore, in the drive control device as an embodiment, the tactile signal is accompanied by timing-related information, which is information related to the timing of the pre-drive, by encoding, and the drive control unit causes the drive unit to execute the pre-drive on the basis of the timing-related information.

This eliminates the need for analysis of a tactile signal on the decoding side when executing a pre-drive at an appropriate timing.

Therefore, it is possible to reduce the processing load on the decoding side.

Furthermore, in the drive control device as an embodiment, the timing-related information includes information indicating the rise timing of the tactile signal.

This eliminates the need for signal analysis for detecting a rise timing of the tactile signal on the decoding side when executing a pre-drive at an appropriate timing.

Therefore, it is possible to reduce the processing load on the decoding side.

Furthermore, in the drive control device as an embodiment, the timing-related information includes information indicating the rise height of the tactile signal.

This eliminates the need for signal analysis for detecting a rise height of a tactile signal on the decoding side when executing a pre-drive at an appropriate timing.

Therefore, it is possible to reduce the processing load on the decoding side.

Furthermore, in the drive control device as an embodiment, the drive control unit executes the pre-drive with the drive signal strength corresponding to the rise height of the tactile signal.

This makes it possible to prevent a delay of a presentation timing to the toucher at the moment of the maximum amplitude at a rise portion of a tactile signal.

Therefore, it is possible to improve the reproducibility of the tactile sense by preventing the perception delay at the moment of the maximum amplitude.

Furthermore, in the drive control device as an embodiment, the drive control unit executes the pre-drive with the drive signal strength corresponding to the perception threshold value related to the human tactile sense.

This makes it possible to match the timing at which a toucher starts to perceive tactile stimulation corresponding to a rise portion of a tactile signal with an original timing.

Therefore, it is possible to improve the reproducibility of the tactile sense in terms of preventing the toucher from starting to percept the tactile sense before the original timing.

Furthermore, in the drive control device as an embodiment, the drive control unit executes the pre-drive with a drive signal strength corresponding to the lowest value of the perception threshold value.

This can prevent tactile stimulation from being perceived regardless of a frequency component of a rise portion of a tactile signal.

Furthermore, in the drive control device as an embodiment, the drive control unit determines the start timing of the pre-drive in units of frames of the tactile signal.

This eliminates the need for timer management in units of samples of a tactile signal when determining a start timing of a pre-drive.

Therefore, it is possible to reduce the processing load in order to prevent delay in the tactile presentation timing.

Furthermore, in the drive control device as an embodiment, the drive control unit determines a start timing of the pre-drive in units of samples of the tactile signal.

This makes it possible to improve an accuracy of a start timing of a pre-drive.

Therefore, it is possible to increase the matching accuracy between the timing at which tactile presentation is actually started and the original timing, and it is possible to improve the reproducibility of the tactile sense.

Furthermore, in the drive control device as an embodiment, the drive control unit sets the start timing of the pre-drive or the drive signal strength on the basis of an operation.

This makes it possible for a system user such as a toucher to adjust a start timing of a pre-drive and a drive signal strength.

Therefore, it is possible to improve the customizability of the execution mode of the pre-drive, and to improve the convenience of the tactile reproduction system.

Furthermore, in the drive control device as an embodiment, the drive unit drives the tactile presentation device by the drive signal amplified by the amplifier, and the drive control unit performs control of bringing the amplifier into the power saving state on the basis of the amplitude value of the tactile signal, and performs control of bringing the amplifier into the start-up state on the basis of the start timing of the pre-drive.

This makes it possible to reduce power consumption caused by bringing an amplifier into a power saving state in a period other than a rise portion of a tactile signal in response to a case where a rise portion of a tactile signal exists discretely in a time direction, and to bring an amplifier into a start-up state before a start timing of a pre-drive.

Therefore, it is possible to improve the reproducibility of the tactile sense by pre-drive while reducing power consumption.

Furthermore, in the drive control device as an embodiment, the drive unit drives a plurality of tactile presentation devices, and the drive control unit (34A) performs the pre-drive so that a tactile presentation timing is synchronized among the plurality of tactile presentation devices.

This makes it possible to prevent variation in tactile presentation timing for each tactile presentation device in a case where a plurality of tactile presentation devices having different responsiveness is used.

Therefore, it is possible to improve the reproducibility of the tactile sense.

Furthermore, in the drive control device as an embodiment, the drive unit drives the plurality of tactile presentation devices, each of which performing tactile presentation to a different receptor of the human body, and the drive control unit executes the pre-drive for each tactile presentation device at the drive signal strength or start timing corresponding to characteristics of the receptor.

This makes it possible to perform the pre-drive for each tactile presentation device in an appropriate mode corresponding to characteristics of a target receptor in a case where a plurality of tactile presentation devices performs tactile presentation targeting different receptors of a human body.

Therefore, it is possible to improve the reproducibility of the tactile sense.

Furthermore, in the drive control device as an embodiment, the drive unit drives the plurality of tactile presentation devices, and the drive control unit executes the pre-drive for each tactile presentation device with the drive signal strength corresponding to the tactile presentation site of the tactile presentation device in the human body.

This makes it possible to perform the pre-drive for each tactile presentation device in an appropriate mode corresponding to tactile characteristics of a site of a human body in a case where a plurality of tactile presentation devices performs tactile presentation targeting different sites of a human body.

Therefore, it is possible to improve the reproducibility of the tactile sense.

Furthermore, the drive control method as an embodiment is a drive control method including causing the drive unit that drives the tactile presentation device by the drive signal based on the tactile signal to execute the pre-drive, which is to drive the tactile presentation device in advance with respect to the rise timing of the tactile signal.

Such drive control method as an embodiment can also achieve similar operations and effects to those of the drive control device as the embodiment described above.

The functions of the encoding units (24, 24A) and the decoding units (F2, 34, 34A) described above can be implemented as software processing by a CPU or the like. The software processing is executed on the basis of a program, and the program is stored in a storage device readable by a computer device (information processing device) such as a CPU.

The program as an embodiment is a program that causes the information processing device to implement the function of causing the drive unit that drives the tactile presentation device by the drive signal based on the tactile signal to execute the pre-drive, which is to drive the tactile presentation device in advance with respect to the rise timing of the tactile signal.

With such program, it is possible to implement the drive control device as the embodiment described above.

Note that the effects described in the present description are merely examples and are not limited thereto, and other effects may be present.

5. PRESENT TECHNOLOGY

Note that the present technology can also have the following configuration.

(1)
A drive control device including
a drive control unit that causes a drive unit that drives a tactile presentation device by a drive signal based on a tactile signal to execute a pre-drive, which is to drive the tactile presentation device in advance with respect to a rise timing of the tactile signal.

(2)
The drive control device according to (1) described above, in which
the drive control unit starts
the pre-drive at a timing corresponding to a responsiveness of the tactile presentation device.

(3)
The drive control device according to (1) or (2) described above described above, in which
the drive control unit starts
the pre-drive at a timing corresponding to a rise height of the tactile signal.

(4)
The drive control device according to any of (1) to (3) described above, in which
the tactile signal is accompanied by timing-related information, which is information regarding a timing of the pre-drive, by encoding, and
the drive control unit causes
the drive unit to execute the pre-drive on the basis of the timing-related information.

(5)
The drive control device according to (4) described above, in which
the timing-related information includes information indicating the rise timing of the tactile signal.

(6)
The drive control device according to (4) or (5) described above, in which
the timing-related information includes information indicating the rise height of the tactile signal.

(7)
The drive control device according to any of (1) to (6) described above, in which
the drive control unit executes
the pre-drive with a drive signal strength corresponding to the rise height of the tactile signal.

(8)
The drive control device according to any of (1) to (7) described above, in which
the drive control unit executes
the pre-drive with a drive signal strength corresponding to a perception threshold value related to a human tactile sense.

(9)
The drive control device according to (8) described above, in which
the drive control unit executes
the pre-drive with a drive signal strength corresponding to a lowest value of the perception threshold value.

(10)
The drive control device according to any of (1) to (9) described above, in which
the drive control unit determines
a start timing of the pre-drive in units of frames of the tactile signal.

(11)
The drive control device according to any of (1) to (9) described above, in which
the drive control unit determines
a start timing of the pre-drive in units of samples of the tactile signal.

(12)
The drive control device according to any of (1) to (11) described above, in which
the drive control unit sets
the start timing of the pre-drive or the drive signal strength on the basis of an operation.

(13)
The drive control device according to any of (1) to (12) described above, in which
the drive unit drives
the tactile presentation device by the drive signal amplified by an amplifier, and
the drive control unit performs
control of bringing the amplifier into a power saving state on the basis of an amplitude value of the tactile signal, and performs control of bringing the amplifier into a start-up state on the basis of the start timing of the pre-drive.

(14)
The drive control device according to any of (1) to (13) described above, in which
the drive unit drives
a plurality of the tactile presentation devices, and
the drive control unit performs
the pre-drive so that a tactile presentation timing is synchronized among the plurality of tactile presentation devices.

(15)
The drive control device according to any of (1) to (14) described above, in which
the drive unit drives
the plurality of tactile presentation devices, each of which performing tactile presentation to a different receptor of a human body, and
the drive control unit executes
the pre-drive for the each tactile presentation device at the drive signal strength or start timing corresponding to characteristics of the receptor.

(16)
The drive control device according to any of (1) to (15) described above, in which
the drive unit drives
the plurality of tactile presentation devices, and
the drive control unit executes
the pre-drive for the each tactile presentation device with the drive signal strength corresponding to a tactile presentation site of the tactile presentation device in a human body.

REFERENCE SIGNS LIST

1 Tactile reproduction system
2, 2A Encoding device
3, 3A Reproduction device
5 Tactile sensor
6 Tactile presentation device
Dc Encoded data
21 Amplifier
24, 24A Encoding unit
24a Signal analysis unit
24b Encoded data generation unit
31 Amplifier
32 D/A converter
33, 33A Postprocessing unit
34, 34A Decoding unit
F1 Drive unit
F2 Drive control unit
3a Display screen
SL Slider operator

The invention claimed is:
1. A drive control device comprising
a drive control unit that causes a drive unit that drives a tactile presentation device by a drive signal based on a tactile signal to execute a pre-drive, which is to drive the tactile presentation device in advance with respect to a rise timing of the tactile signal,
wherein the drive unit drives the tactile presentation device by the drive signal amplified by an amplifier, and
the drive control unit performs control of bringing the amplifier into a power saving state on a basis of an amplitude value of the tactile signal, and performs control of bringing the amplifier into a start-up state on a basis of a start timing of the pre-drive.
2. The drive control device according to claim 1, wherein the drive control unit starts the pre-drive at a timing corresponding to a responsiveness of the tactile presentation device.
3. The drive control device according to claim 1, wherein the drive control unit starts the pre-drive at a timing corresponding to a rise height of the tactile signal.
4. The drive control device according to claim 1, wherein the tactile signal is accompanied by timing-related information, which is information regarding a timing of the pre-drive, by encoding, and
the drive control unit causes the drive unit to execute the pre-drive on a basis of the timing-related information.
5. The drive control device according to claim 4, wherein the timing-related information includes information indicating the rise timing of the tactile signal.
6. The drive control device according to claim 4, wherein the timing-related information includes information indicating a rise height of the tactile signal.
7. The drive control device according to claim 1, wherein the drive control unit executes the pre-drive with a drive signal strength corresponding to a rise height of the tactile signal.
8. The drive control device according to claim 1, wherein the drive control unit executes the pre-drive with a drive signal strength corresponding to a perception threshold value related to a human tactile sense.
9. The drive control device according to claim 8, wherein the drive control unit executes the pre-drive with a drive signal strength corresponding to a lowest value of the perception threshold value.
10. The drive control device according to claim 1, wherein the drive control unit determines a start timing of the pre-drive in units of frames of the tactile signal.
11. The drive control device according to claim 1, wherein the drive control unit determines a start timing of the pre-drive in units of samples of the tactile signal.
12. The drive control device according to claim 1, wherein the drive control unit sets a start timing of the pre-drive or a drive signal strength on a basis of an operation.
13. The drive control device according to claim 1, wherein the drive unit drives a plurality of the tactile presentation devices, and
the drive control unit performs the pre-drive so that a tactile presentation timing is synchronized among the plurality of tactile presentation devices.
14. The drive control device according to claim 1, wherein the drive unit drives a plurality of the tactile presentation devices, each of which performing tactile presentation to a different receptor of a human body, and
the drive control unit executes the pre-drive for the each tactile presentation device at a drive signal strength or start timing corresponding to characteristics of the receptor.
15. The drive control device according to claim 1, wherein the drive unit drives a plurality of the tactile presentation devices, and the drive control unit executes
the pre-drive for the each tactile presentation device with a drive signal strength corresponding to a tactile presentation site of the tactile presentation device in a human body.
16. A drive control method comprising
causing a drive unit that drives a tactile presentation device by a drive signal based on a tactile signal to execute a pre-drive, which is to drive the tactile presentation device in advance with respect to a rise timing of the tactile signal,
wherein the drive unit drives the tactile presentation device by the drive signal amplified by an amplifier, and
a drive control unit performs control of bringing the amplifier into a power saving state on a basis of an amplitude value of the tactile signal, and performs control of bringing the amplifier into a start-up state on a basis of a start timing of the pre-drive.
17. A non-transitory storage medium encoded with instructions that, when executed by a computer, execute processing comprising
causing an information processing device to implement a function of causing a drive unit that drives a tactile presentation device by a drive signal based on a tactile signal to execute a pre-drive, which is to drive the tactile presentation device in advance with respect to a rise timing of the tactile signal,
wherein the drive unit drives the tactile presentation device by the drive signal amplified by an amplifier, and a drive control unit performs control of bringing the amplifier into a power saving state on a basis of an amplitude value of the tactile signal, and performs control of bringing the amplifier into a start-up state on a basis of a start timing of the pre-drive.

* * * * *